(12) United States Patent
Dopp et al.

(10) Patent No.: US 11,476,487 B2
(45) Date of Patent: *Oct. 18, 2022

(54) THREE-ELECTRODE SOLID-STATE ENERGY HARVESTER OF TRANSITION METAL SUBOXIDES

(71) Applicant: Omega Energy Systems, LLC, Savannah, GA (US)

(72) Inventors: Robert B. Dopp, Marietta, GA (US); Michael Lee Horovitz, Savannah, GA (US); Greyson Williams, Charlottesville, VA (US)

(73) Assignee: Omega Energy Systems, LLC, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/096,424

(22) Filed: Nov. 12, 2020

(65) Prior Publication Data

US 2021/0143465 A1 May 13, 2021

Related U.S. Application Data

(60) Provisional application No. 62/934,639, filed on Nov. 13, 2019.

(51) Int. Cl.
*H01M 8/10* (2016.01)
*H01M 8/22* (2006.01)
(Continued)

(52) U.S. Cl.
CPC ............ *H01M 8/22* (2013.01); *H01M 4/8626* (2013.01); *H01M 4/8668* (2013.01); *H01M 4/8803* (2013.01); *H01M 4/9025* (2013.01); *H01M 8/126* (2013.01); *H01M 8/1233* (2013.01); *H01M 2008/1293* (2013.01); *H01M 2300/0074* (2013.01)

(58) Field of Classification Search
None
See application file for complete search history.

(56) References Cited

U.S. PATENT DOCUMENTS

| 2,654,795 A | 10/1953 | Brill et al. |
| 8,115,683 B1 | 2/2012 | Stefanakos et al. |

(Continued)

FOREIGN PATENT DOCUMENTS

| EP | 1524252 A2 | 4/2005 |
| RU | 2170468 C1 | 7/2001 |

(Continued)

OTHER PUBLICATIONS

U.S. Appl. No. 62/641,779, filed Mar. 12, 2018, Michael Lee Horovitz.

(Continued)

*Primary Examiner* — Lucas J. O'Donnell
(74) *Attorney, Agent, or Firm* — Rouget F. Henschel; Potomac Law Group, PLLC

(57) ABSTRACT

Solid-state energy harvesters comprising layers of metal suboxides and cerium dioxide utilizing a solid-state electrolyte to produce power and methods of making and using the same are provided. The solid-state energy harvester may have two or three electrodes per cell and produces power in the presence of water vapor and oxygen.

36 Claims, 38 Drawing Sheets

(51) Int. Cl.
*H01M 4/90* (2006.01)
*H01M 4/86* (2006.01)
*H01M 4/88* (2006.01)
*H01M 8/1233* (2016.01)
*H01M 8/126* (2016.01)
*H01M 8/12* (2016.01)

(56) References Cited

U.S. PATENT DOCUMENTS

| | | | |
|---|---|---|---|
| 9,029,026 | B2 | 5/2015 | Horovilz |
| 9,087,645 | B2 | 7/2015 | Holme et al. |
| 9,450,278 | B2 | 9/2016 | Kim et al. |
| 9,680,193 | B2 | 6/2017 | Amendola et al. |
| 9,831,530 | B2 | 11/2017 | Yokoyama |
| 10,141,492 | B2 | 11/2018 | Kasichainula |
| 10,142,125 | B2 | 11/2018 | Lee-Own et al. |
| 10,147,863 | B2 | 12/2018 | Xu et al. |
| 10,879,735 | B2 * | 12/2020 | Horovitz ............. H01G 11/04 |
| 2010/0032001 | A1 | 2/2010 | Brantner |
| 2012/0145216 | A1 | 6/2012 | Fujiwara |
| 2013/0140950 | A1 | 6/2013 | Fuentes-Fernandez et al. |
| 2013/0269782 | A1 | 10/2013 | Matos et al. |
| 2017/0149093 | A1 | 5/2017 | Sun et al. |
| 2019/0280523 | A1 | 9/2019 | Horovitz et al. |

FOREIGN PATENT DOCUMENTS

| | | |
|---|---|---|
| RU | 2585252 C2 | 5/2016 |
| WO | 2006128687 A2 | 12/2006 |
| WO | 2012122273 A2 | 9/2012 |
| WO | 2012122273 A3 | 12/2012 |
| WO | 2014003540 A2 | 1/2014 |
| WO | 2014147648 A1 | 9/2014 |

OTHER PUBLICATIONS

Bulfin et al., "Analytical model of CeO2 Oxidation and Reduction," Journal of Physical Chemistry C, Oct. 16, 2013, vol. 117 (46), pp. 24129-24137.

Gellings et al., "Solid state aspects of oxidation catalysis," Catalysis Today, Apr. 28, 2000, vol. 58(1), pp. 1-53.

International Search Report and Written Opinion dated Feb. 4, 2021 for International Patent Application No. PCT/US2020/060173.

International Search Report and Written Opinion dated May 30, 2019 for International Patent Application No. PCT/US2019/021655.

Sigler, "All-Electron Battery—Stanford Strikes Again," blog.cafefoundation.org, Mar. 28, 2015, Retrieved from http://cafe.foundation/blog/electron-battery-stanford-strikes/.

Zhang et al., "The role of single oxygen or metal induced defect and correlated multiple defects in the formation of conducting filaments," Department of Precision Instrument, Centre for Brain Inspired Computing Research, Tsinghua University, Beijing, China, J. Phys. D: Appl. Phys., Feb. 23, 2016, vol. 49(12), pp. 1-15.

Parks et al., "The Zero Point of Charge of Oxides," The Journal of Physical Chemistry, 1962, vol. 66(6), pp. 967-973, ACS Publications, Washington, DC.

Szekeres et al., "Surface charge characterization of metal oxides by potentiometric acid-base titration, revisited theory and experiment," Colloids and Surfaces A: Physicochemical and Engineering Aspects, 2012, vol. 414, pp. 302-313, Elsevier, Amsterdam, Netherlands.

Extended European Search Report dated Nov. 29, 2021 for European Patent Application No. 19768381.6.

* cited by examiner

THREE-ELECTRODE SOLID-STATE ENERGY HARVESTER OF TRANSITION METAL SUBOXIDES

CROSS-REFERENCE TO RELATED APPLICATIONS

This application claims the benefit of U.S. Provisional Patent Application No. 62/934,639 filed Nov. 13, 2019, which is hereby incorporated by reference in its entirety.

All references cited herein, including, but not limited to patents and patent applications, are incorporated by reference in their entirety.

BACKGROUND

Energy harvesters are devices that do not store energy, but rather gather it from the environment. See, e.g., U.S. Pat. Nos. 8,115,683; 10,147,863; 10,142,125; and 10,141,492. For example, energy harvesters gather energy from a variety sources (e.g., solar power, thermal energy, wind energy, salinity gradients, kinetic energy, piezoelectric, pyroelectric, thermoelectric, and RF-capturing devices like the crystal radio). Some are very high-energy generators, such as wind and solar, and some are very low energy output such as the piezoelectric or RF harvesters. These energy harvesters, however, do not store energy, but rather harvest it from their surroundings.

There have been recent efforts to make a battery using only electrons to transfer charge rather than ions. Sigler, D., "All-Electron Battery—Stanford Strikes Again," CAFE Foundation ( Mar. 28, 2015) (cafe.foundation/blog/electron-battery-stanford-strikes). However, these devices store rather than harvest energy.

What is needed are energy harvester devices that use solid-state electrolytes to generate on-demand energy from the surrounding environment for a variety of applications.

SUMMARY

Aspects described herein provide solid-state energy harvesters, comprising a first current collector comprising a conductor, a first layer comprising a first transition metal suboxide and a solid-state electrolyte (SSE) wherein the first layer is an anode and in contact with the current collector, a second layer comprising an admixture of a second transition metal suboxide, and a lanthanide oxide or dioxide, wherein the admixture forms an SSE and is in contact with the first current collector, and a third layer comprising a third transition metal suboxide, wherein the third layer is a cathode and is in contact with the second layer, and a second current collector. It is understood that the solid-state energy harvesters described herein can optionally be configured to store energy or can be coupled with an energy storage device.

Further aspects provide solid-state energy harvesters, comprising a current collector comprising porous carbon fiber, filaments, powder or paper, and conductor, a first layer comprising a first transition metal suboxide, and a solid-state electrolyte (SSE) wherein the first layer is an anode and in contact with the current collector, a second layer comprising an admixture of a second transition metal suboxide, and a lanthanide oxide or dioxide, wherein the admixture forms a SSE and is in contact with the first layer and a third layer comprising a third transition metal suboxide, wherein the third layer is a cathode and is in contact with the second layer, the anode, and the current collector wherein the solid-state energy harvester produces current in a presence of oxygen and water vapor.

In another aspect, methods of making a solid-state energy harvester, comprising: grinding an anode mixture comprising a first transition metal suboxide, a solid-state electrolyte, and a binder, grinding a solid-state electrolyte (SSE) mixture comprising a lanthanide, a second transition metal suboxide, and a binder, grinding a cathode mixture comprising a third transition metal suboxide, a solid-state electrolyte and a binder, admixing a carbon powder to each of the anode mixture, the SSE mixture and the cathode mixture, forming the anode mixture into a first layer, wherein the first layer is an anode, forming the SSE mixture into a second layer, wherein the second layer is an SSE separator, forming the cathode mixture into a third layer, wherein the third layer is a cathode, and connecting the first layer to the second layer and the second layer to the third layer wherein the first transition metal suboxide and the second transition metal suboxide are different from each other are provided.

DETAILED DESCRIPTION

Figure 1:
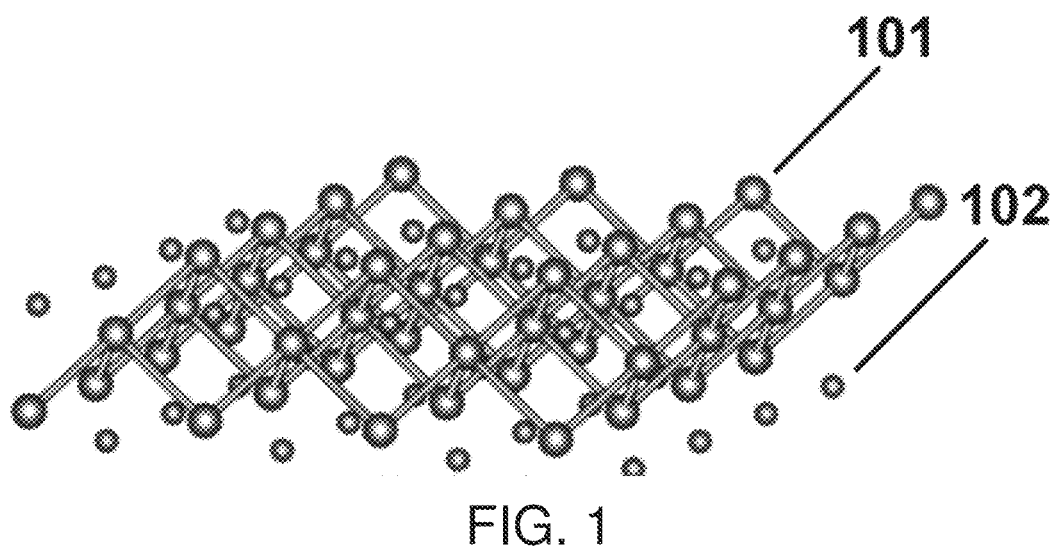
FIG. 1 shows an exemplary crystal structure of cerium dioxide.

The disclosed methods, compositions, and devices below may be described both generally as well as specifically. It should be noted that when the description is specific to an aspect, that aspect should in no way limit the scope of the apparatus or methods. The feature and nature of the present disclosure will become more apparent from the detailed description set forth below when taken in conjunction with the accompanying drawings.

Aspects described herein provide a solid-state energy harvester, comprising a first current collector comprising a highly conductive solid sheet such as gold plated brass.

A first layer of the energy harvester can have a first transition metal suboxide, and a solid-state electrolyte (SSE) wherein the first layer is an anode and is in contact with the first current collector.

A second layer can have an admixture of a second transition metal suboxide, and a lanthanide oxide or dioxide, wherein the admixture forms a solid-state electrolyte (SSE) and is in contact with the first layer.

A third layer of the energy harvester can comprise a third transition metal suboxide, wherein the third layer is a cathode and is in contact with the second layer and in contact with a porous carbon fiber, a filament, a powder or a paper current collector.

The first transition metal suboxide can be selected from the group consisting of tungsten suboxide, cobalt suboxide, $Na_{1.0}Mo_{1.5}WO_{6.0}$, $Na_{0.9}Mo_6O_{17}$, $Na_{1.0}Ti_{1.5}WO_{4.5}$, $Na_{1.2}Ti_{0.34}WO_4$, $Ti_4O_7$, $Ti_5O_9$, $K_{1.28}Ti_8O_{16}$, $K_{1.04}Ti_8O_{16}$, $K_{0.48}Ti_8O_{16}$, $Na_4WO_3$, $Na_{0.90}WO_{1.81}$, $Na_{0.82}WO_{1.81}$, $Na_{0.74}WO_{1.81}$, $K_{0.9}WO_3$, $WO_{2.72}$, $WO_{2.82}$, $WO_{2.9}$, $Na_2WO_4$, $Na_{8.2}WO$, $Na_2O_2WO_3$, $Na_{1.2}Ti_{0.34}WO_4$, $Na_{1.2}Cu_{0.31}WO_{7.2}$, $Na_{1.2}Mo_{0.31}WO_{5.2}$, and $Na_2O_4WO_3$.

The third transition metal suboxide can be selected from the group consisting of tungsten suboxide, cobalt suboxide, $Co_3O_4$, $Na_{1.0}Mo_{1.5}WO_{6.0}$, $Na_{0.9}Mo_6O_{17}$, $Na_{1.0}Ti_{1.5}WO_{4.5}$, $Na_{1.2}Ti_{0.34}WO_4$, $K_{1.28}Ti_8O_{16}$, $K_{1.04}Ti_8O_{16}$, $K_{0.48}Ti_8O_{16}$, $Na_4WO_3$, $Na_{0.90}WO_{1.81}$, $Na_{0.82}WO_{1.81}$, $Na_{0.74}WO_{1.81}$, $K_{0.9}WO_3$, $WO_{2.72}$, $WO_{2.82}$, $WO_{2.9}$, $Na_2WO_4$, $Na_{8.2}WO$, $Na_2O_2WO_3$, $Na_{1.2}Ti_{0.34}WO_4$, $Na_{1.2}Cu_{0.31}WO_{7.2}$, $Na_{1.2}Mo_{0.31}WO_{5.2}$, and $Na_2O_4WO_3$.

The first transition metal suboxide, second transition metal suboxide, or third transition metal suboxide can be selected from the group consisting of boron, iron, copper and nickel.

In a further aspect, the first transition metal suboxide is an alkaline metal suboxide (e.g., rubidium and caesium).

The lanthanide oxide can be selected from the group consisting of cerium dioxide, lanthanum oxide or dioxide, praseodymium oxide or dioxide, neodymium oxide or dioxide, promethium oxide or dioxide, samarium oxide or dioxide, europium oxide or dioxide, gadolinium oxide or dioxide, terbium oxide or dioxide, dysprosium oxide or dioxide, holmium oxide or dioxide, erbium oxide or dioxide, thulium oxide or dioxide, ytterbium oxide or dioxide, and lutetium oxide or dioxide.

In yet another aspect, the first transition metal suboxide is $Ti_4O_7$. In one aspect, the second transition metal suboxide is $WO_{2.9}$. In another aspect, the third transition metal suboxide is $Co_3O_4$. In a further aspect, first layer and the third layer do not substantially comprise noble metals.

In one aspect, the first layer, second layer and the third layer each further comprise a binder (e.g., unsintered Teflon (PTFE), FEP, Paraffin and epoxy).

The anode can comprise between about 0.01% and about 14% water. The cathode can comprise between about 0.01% and about 4% water.

In a further aspect, the first transition metal suboxide, the second transition metal suboxide, and the third transition metal suboxide each have a stoichiometry $M_{x-y}$, wherein:
  M is a transition metal M,
  x is base valence value of the transition metal M,
  y is deviation from unity, and
  when M is titanium, x is 4 and y is at least 0.5,
  when M is cobalt, x is 3 and y is at least 0.3, and
  when M is tungsten, x is 5 and y is at least 0.2.

The conductor can comprise a metal selected from the group consisting of gold, nickel, copper, brass, bronze, and porous carbon fiber.

In one aspect, the porous carbon fiber comprises greater than about 50% pores. In another aspect, the pores have a diameter from about 10 μm to about 40 μm.

In a further aspect, the current collector comprises a foamed metal.

Aspects described herein provide a solid-state energy harvester system, comprising a first energy harvester and a second energy harvester, wherein the first energy harvester and the second energy harvester comprise the solid-state energy harvester as described herein, and wherein the first layer of the first energy harvester is in electrical connection to the third layer of the second energy harvester. The first layer of each of the first and second energy harvesters can comprise titanium suboxide and the third layer of each of the first and second energy harvesters can comprise cobalt suboxide.

Further aspects provide a solid-state energy harvester, comprising a current collector comprising a solid metallic current collector (e.g., gold-plated); a first layer comprising a first transition metal suboxide, and a solid-state electrolyte (SSE) wherein the first layer is an anode and in contact with the current collector; a second layer comprising an admixture of a second transition metal suboxide, and a lanthanide oxide or dioxide, wherein the admixture forms a SSE and is in contact with the first layer; and a third layer comprising a third transition metal suboxide, wherein the third layer is a cathode and is in contact with the second layer, the anode, and a current collector comprising porous carbon fiber, filaments, powder or paper, wherein the solid-state energy harvester produces current in a presence of oxygen and water vapor.

In one aspect, having the exemplary solid-state energy harvester in the presence of water vapor and/or increased relative humidity (RH) can improve the current density produced by the exemplary solid-state energy harvester. In contrast, it is believed that liquid water can reduce the current density produced by the exemplary solid-state energy harvester. In some instances, the solid-state energy harvester can have an internal water supply configured to increase the relative humidity surrounding the solid-state energy harvester.

Without being bound by theory, it is believed that water dissociation of the surface adsorbed water molecules produces hydroxyl's (OH−) and protons (H+) and the protons are the internal charge-transfer element.

In one aspect, the electrochemical flow for the anode can be $H_2O + TiO_x \rightarrow TiO_xOH^- + H^+ \rightarrow TiO_x + \frac{1}{2}O_2 + H^+ + 2e^-$ or simplified to $H_2O—TiO_x \rightarrow \frac{1}{2}O_2 + 2H_+ + 2e^-$. In this aspect, the electrons pass through an external circuit to the cathode.

In one aspect, the electrochemical flow for the cathode is $2CoOx + 2H + +2e- \rightarrow 2CoO_x + H_2$ or simplified to $2H^+ + 2e^- — CoO_x \rightarrow H_2$.

Without being bound by theory, it is believed that the exemplary solid-state energy harvester may be exhaling oxygen from the anode and hydrogen from the cathode.

In one aspect, the moisture uptake of exemplary compounds used in the solid-state energy harvester is $CoO_2 > Ti_4O_7 >> Co_3O_4 > WO_{2.9}$.

In some instances, the first transition metal suboxide comprises $Ti_4O_7$, the second transition metal suboxide comprises $Co_3O_4$, and the SSE comprises $CeO_2$ and $W_{2.9}$.

In some instances, the thickness of at least one of the first layer, second layer and the third layer is from about 0.25 mm to about 1 mm.

In some instances, the thickness of at least one of the first layer, second layer and the third layer is about 0.7 mm.

In some aspects, the current density produced by the solid-state energy harvester in a relative humidity of 85% is about 50% of its maximum current density at 100% RH.

Methods of making a solid-state energy harvester are also provided. Exemplary methods comprise (1) grinding a solid-state electrolyte (SSE) comprising a lanthanide and the second transition metal suboxide, and a binder; (2) grinding an anode mixture comprising a first transition metal suboxide, the SSE and a binder (3) grinding a cathode mixture comprising a third transition metal suboxide, the SSE and a binder; (4) admixing a carbon powder to each of the anode mixture, the and the cathode mixture; (5) forming the anode mixture into a first layer, wherein the first layer is an anode; (6) forming the SSE mixture into a second layer, wherein the second layer is an SSE separator; (7) forming the cathode mixture into a third layer, wherein the third layer is a cathode; and (8) connecting the first layer to the second layer and the second layer to the third layer wherein the first transition metal suboxide, the second transition metal suboxide and the third transition metal suboxide are different from each other.

Without being bound by theory, it is believed that performing step 4 (admixing a carbon powder) following the grinding steps (2) and (3) unexpectedly results in improved performance as described in Example 13 and accompanying figures.

The first transition metal suboxide and the second transition metal suboxide can each be selected from the group consisting of tungsten suboxide, cobalt suboxide, $Co_3O_4$, $Na_{1.0}Mo_{1.5}WO_{6.0}$, $Na_{0.9}Mo_6O_{17}$, $Na_{1.0}Ti_{1.5}WO_{4.5}$, $Na_{1.2}Ti_{0.34}WO_4$, $Ti_4O_7$, $Ti_5O_9$, $K_{1.28}Ti_8O_{16}$, $K_{1.04}Ti_8O_{16}$, $K_{0.48}Ti_8O_{16}$, $Na_4WO_3$, $Na_{0.90}WO_{1.81}$, $Na_{0.82}WO_{1.81}$, $Na_{0.74}WO_{1.81}$, $K_{0.9}WO_3$, $WO_{2.72}$, $WO_{2.82}$, $WO_{2.9}$, $Na_2WO_4$, $Na_{8.2}WO$, $Na_2O_2WO_3$, $Na_{1.2}Ti_{0.34}WO_4$, $Na_{1.2}Cu_{0.31}WO_{7.2}$, $Na_{1.2}Mo_{0.31}WO_{5.2}$, and $Na_2O_4WO_3$.

In another aspect, the anode mixture, the SSE mixture, and the cathode mixture are ground in a high-shear, high intensity blender for at least one minute.

In a further aspect, the first layer, second layer and the third layer are not separated by physical separators. The first transition metal suboxide and third transition metal suboxide can each selected from the group consisting of titanium, cobalt, tungsten, or cesium. The first transition metal suboxide can comprise titanium suboxide. In another aspect, each of the anode mixture and the SSE mixture has a water content of less than about 25 weight percent.

The second transition metal suboxide can comprise cobalt suboxide. In a further aspect, each of the first layer, the second layer and the third layer has a water content of less than about 5 weight percent.

Each of the first layer, second layer and the third layer can comprise a solid-state electrolyte comprising tungsten suboxide and cerium dioxide. In a further aspect, each of the anode mixture, the SSE mixture, and the cathode mixture has a water content of less than about 10 weight percent.

The binder can be selected from the group consisting of, unsintered polytetrafluoroethylene (PTFE), FEP, Paraffin and epoxy. In one aspect, the binder is less than about 50 volume percent of each of the first layer, second layer and the third layer.

In yet another aspect, the first layer, the second layer, and the third layer are formed by compression in a roller mill to produce a back-extrusion. In this aspect, the solid-state energy harvester can optionally not contain physical separators between the first layer and the second layer and the third layer.

In one aspect, the anode mixture comprises about 17% (w/w) $CeO_2$, 33% (w/w) $WO_{2.9}$, 50% (w/w) $Ti_4O_7$ and 40 volume percent powdered PTFE.

The cathode mixture can comprise about 17% (w/w) $CeO_2$, 33% (w/w) $WO_{2.9}$, 50% (w/w) $Co_3O_4$ and 40 volume percent powdered PTFE.

In one aspect, the anode mixture comprises about 17% (w/w) $CeO_2$, 33% (w/w) $WO_{2.9}$, 50% (w/w) $Ti_4O_7$ and 40 volume percent powdered PTFE; the solid-state electrolyte mixture comprises about 67% (w/w) $WO_{2.9}$, 33% (w/w) $CeO_2$ and 40 volume percent powdered PTFE and the cathode mixture comprises about 17% (w/w) $CeO_2$, 33% (w/w) $WO_{2.9}$, 50% (w/w) $Co_3O_4$ and 40 volume percent powdered PTFE.

In another aspect, each of the first layer, second layer and the third layer comprise Teflon particles, the binder comprise powders, and each of the first layer and the second layer is made using a roller mill to force extrude the powders through rollers of a mill, and extrude the Teflon particles into fibrils.

The solid-state energy harvester can optionally be encased in a non-conductive, essentially gas impervious housing. The non-conductive, essentially gas impervious housing can have a gas inlet and a gas outlet on opposite sides of the non-conductive, essentially gas impervious housing.

In a further aspect, the non-conductive, essentially gas impervious housing is made of a material selected from the group consisting of polyacrylate and polycarbonate.

Transition Metal Suboxide and Defect Theory

The general theory described herein applies to the exemplary active components in the energy harvester, e.g., $Ti_4O_7$, $WO_{2.9}$, $Co_3O_4$ and $CeO_2$. Members of non-stoichiometric metal oxide suboxides called the Magnéli phases exhibit lower bandgaps and resistivities, with the highest electrical conductivities. These phases have high oxygen vacancies and electronic connections increase with increases in oxygen vacancies. Electrons from the d-orbital split into two components with different energies called the t2g and eg orbitals. The electron-conducting path can be switched back and forth by the drift of charged oxygen vacancies. The conductivity in the conduction band can result either from these oxygen vacancies and/or metal induced defects. It has been suggested that the hypo-stoichiometry can result from either oxygen vacancy or metal interstitial, as expressed in the Kroger-Vink notation by the following two Redox reactions, respectively:

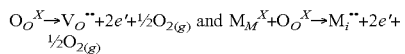

See, e.g., Zhang et al. "The role of single oxygen or metal induced defect and correlated multiple defects in the formation of conducting filaments", Department of Precision Instrument, Centre for Brain Inspired Computing Research, Tsinghua University, Beijing, China, incorporated herewith in its entirety.

These equations allow charge movement reactions to be described separately, for example as:

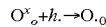

Where $O^x_o$ denotes an oxygen ion sitting on an oxygen lattice site, with neutral charge, h. denotes an electron hole, and $O_{·o}$ denotes a singlet oxygen atom with a single charge. Also,

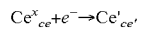

Where $Ce^x_{ce}$ denotes a cerium ion sitting on a cerium lattice site, with neutral charge, and $Ce'_{ce'}$ denotes a cerium anion on an interstitial site, with single negative charge.

This is an exemplary description of how a cerium ion sitting on a cerium lattice site with neutral charge can accept an electron and become a charged cerium ion on that lattice site, and how charge is transferred in the solid state electrolyte described herein.

See, also "Solid state aspects of oxidation catalysis" by Gellings et al., Laboratory for Inorganic Materials Science, University of Twente, PO Box 217, NL-7500 AE Enschede, The Netherlands, (2000), incorporated herewith in its entirety.

For protonic defects in oxides, an illustrative formation reaction between water molecules and oxygen vacancies is as follows:

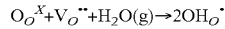

In this reaction, two effectively positive hydroxyl-groups on regular oxygen positions are formed. Additional defect reactions where protonic defects are formed by reaction with hydrogen are set forth below. A reaction with electron holes is as follows:

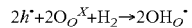

where the presence of excess holes is required. Alternatively, oxidation of hydrogen under formation of free electrons is illustrated by the following reaction:

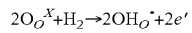

where the electrons are assumed to be donated to the conduction band.

Gellings, et. al., propose that at low temperatures, the dissolution of water in the Li/MgO catalyst occurs through reaction with oxygen, or with oxygen vacancies, as shown in the following equations:

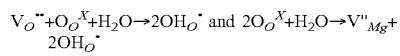

At low temperatures (e.g., 673 K) the conductivity is found to be caused by $OH_O·$ ions as the main charge carriers. This shows the importance of water in the transport of charge in both the $Ti_4O_7$ anode and the $CeO_2$ solid-state "electrolyte".

It has been theorized that $CeO_2$ can store and transport oxygen and, in its reduced state, $CeO_2$ splits water to release hydrogen as shown in the following equations (see Analytical Model of $CeO_2$ Oxidation and Reduction by B. Bulfin, et al., School of Physics, Trinity College Dublin, College Green, Dublin 2, Ireland, *J. Phys. Chem. C*, 2013, 117 (46), pp 24129-24137, DOI: 10.1021/jp406578z, Publication Date (Web): Oct. 16, 2013, incorporated herewith in its entirety).

$$CeO_2 \rightarrow CeO_{2-\delta} + \frac{\delta}{2}O_2$$

and $$CeO_{2-\delta} + \delta H_2O \rightarrow CeO_2 + \delta H_2$$

Bulfin et al. explain the relationship between cerium dioxide and its suboxide states, and the resulting activity of these molecules, mostly pertaining to manufacturing synfuels and catalytic converters. The relationship described by Bulfin et al. uses the Arrhenius equation, which teaches that the rate constant of most chemical reactions increases by the negative power of the reciprocal absolute temperature. According to Bulfin et al. the effect is shown at above 500° C. However, many of the graphs in Bulfin et al. show that some activity occurs at ambient temperatures.

In one aspect, the solid-state energy harvesters described herein perform well up to about 90 degrees centigrade in the presence of a relative humidity of at least about 85%.

In one aspect, the energy harvesters described herein have five components: $WO_{2.9}$, $CeO_2$, $Co_3O_4$, $Ti_4O_7$ and unsintered PTFE powder. Table 1 below shows the composition of an exemplary aspect, wherein percentages are weight-percent, except for PTFE binder given in volume percent. The components 1 and 2 in Table 1 are components of the Solid State Electrolyte (SSE), component 3 is the active ingredient of the anode, and component 4 is the active component of the cathode. PTFE is the binder. The three electrodes shown in Table 1 include the titanium-containing anode, the separator, and the cobalt-containing cathode. Moisture values were measured, and percentages were determined from the results of several factorial experiments shown below in Table 1. The "separator" layer can be omitted from the design resulting in a two-electrode design.

TABLE 1

| Components | | Max Moisture | Percentages (w/w) unless indicated otherwise | | |
|---|---|---|---|---|---|
| | | | Anode | Separator (If Present) | Cathode |
| $CeO_2$ | SSEa | 4.8% | 17% | 33% | 17% |
| $WO_{2.9}$ | SSEb | 9.1% | 33% | 67% | 33% |
| $Ti_4O_7$ | Anode | 20.3% | 50% | | |
| $Co_3O_4$ | Cathode | 0.72% | | | 50% |
| T7c | Binder | 0.50% | 40 Vol % | 40 Vol % | 40 Vol % |

In one aspect, cerium dioxide ($CeO_2$) and a tungsten suboxide are used as solid-state electrolytes. In this aspect, the tungsten suboxide is $WO_{2.9}$. In this aspect, the components are present in a ratio of 1 part $CeO_2$ to 2 parts $WO_{2.9}$.

Cerium dioxide is a large molecule (MW=172.12) with the oxygen atoms on the outer portion of the crystal structure. The oxygen atoms are loosely attached and therefore easily moved from one molecule to the next. In FIG. 1, cerium atoms 101, and oxygen atoms 102 are shown. Without being bound by theory, it is believed that the atomic size difference between cerium atoms 101 and oxygen atoms 102 allows the oxygen atoms relative freedom to move around and catalyze redox reactions. FIG. 1 illustrates how loosely connected the exemplary oxygen atoms are from the large lanthanide cerium.

In another aspect, the energy harvester contains a low percentage of water. Neutral water has a $1 \times 10^{-7}$ molarity of $H^+$ and $OH^-$ ions used in the above equations, and illustrated by the following:

$$H_2O \rightarrow H^+ + OH^-$$

$$2H_2O \rightarrow 2H_2 + O_2$$

The $CeO_2$ as described in Zhang can catalyze this reaction. While not wishing to be bound by theory, the following 2 mechanisms may be relevant.

Mechanism 1

The use of $CeO_2$ as a catalyst with mobile oxygen atoms is described in an article dealing with catalytic converters in trucks, "Structural, redox and catalytic chemistry of ceria based materials", by G. Ranga Rao et al., Bulletin of the Catalysis Society of India (2003) 122-134 incorporated herewith in its entirety. The $CeO_2$ as a catalyst was used to catalyze conversion of methane gas to $CO_2$ and water among other pollutant cleaning catalysis.

Figure 2:
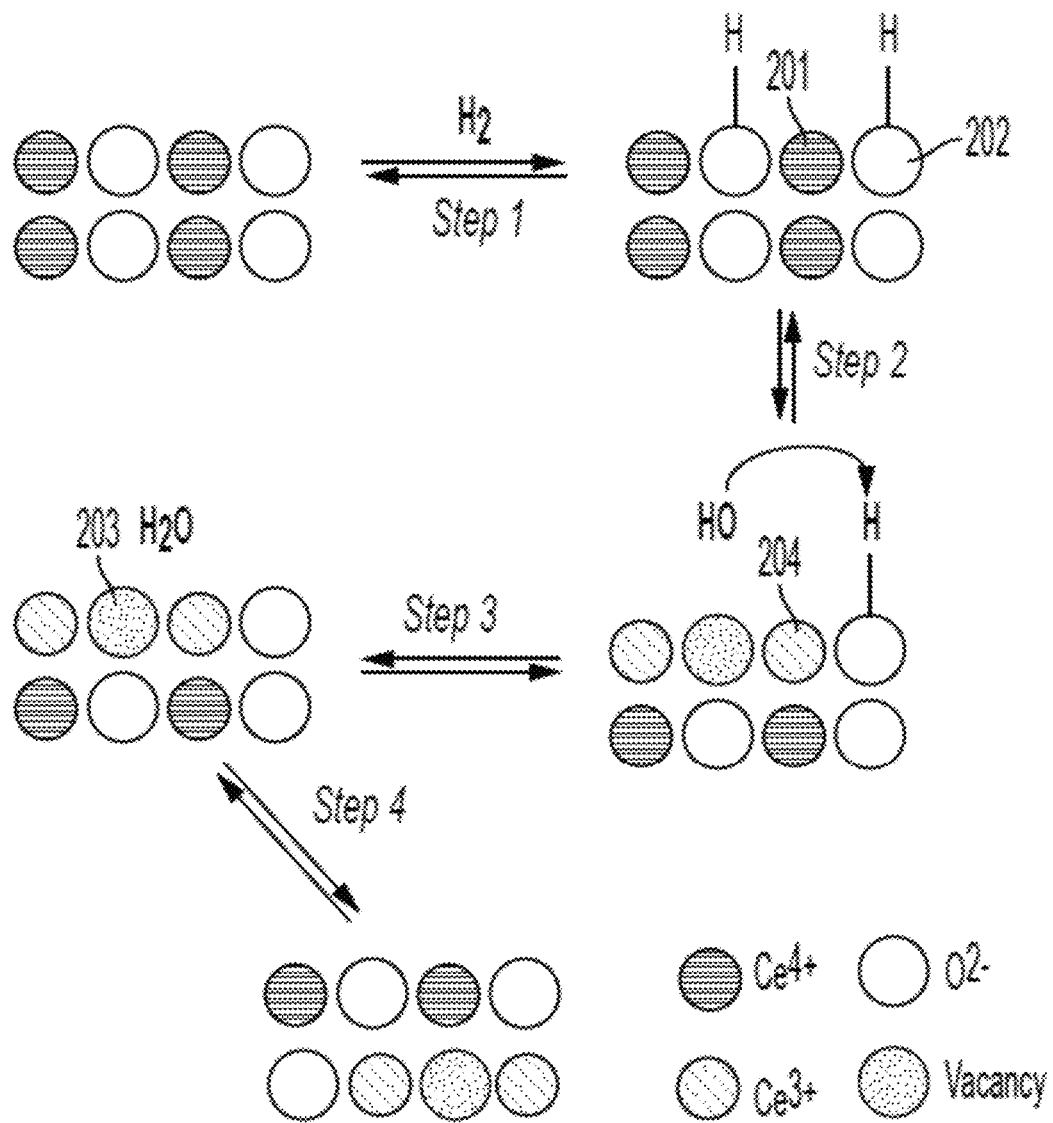
FIG. 2 shows an exemplary cerium reduction mechanism.

The following equations (as illustrated in FIG. 2 where 201=$Ce4+$, 202=$O2-$, 203=Vacancies and 204=$Ce3+$) show the steps of the process, where V=Vacancy:

$$H_2 + Ce^{+4}{}_4O^{-2}{}_4 \leftarrow \text{Step 1} \rightarrow \qquad \text{Equation 3}$$

$$Ce^{+4}{}_4O^{-2}{}_4H_2 \leftarrow \text{Step 2} \rightarrow \qquad \text{Equation 4}$$

$$Ce^{+4}{}_2Ce^{+3}{}_2O^{-2}{}_3H^+V + OH^- \leftarrow \text{Step 3} \rightarrow \qquad \text{Equation 5}$$

$$Ce^{+4}{}_2Ce^{+3}{}_2O^{-2}{}_3V + H_2O \leftarrow \text{Step 4} \rightarrow \qquad \text{Equation 6}$$

$$Ce^{+4}{}_2Ce^{+3}{}_2O^{-2}{}_3V \qquad \text{Equation 7}$$

Sum equation:

$$H_2 + Ce^{+4}{}_4O^{-2}{}_4 \rightarrow Ce^{+4}{}_2Ce^{+3}{}_2O^{-2}{}_3V \qquad \text{Equation 8}$$

Mechanism 2

Cerium dioxide ($CeO_2$) is well known for its oxygen mobility. $CeO_2$ undergoes rapid redox cycles, for example:

$$2CeO_2 \rightarrow Ce_2O_3 + \frac{1}{2}O_2 \qquad \text{Equation 9}$$

$$Ce^{+4} \rightarrow Ce^{+3} \quad Eo = 1.61$$

Cerium dioxide acts as an oxygen buffer by storing/releasing $O_2$ due to the redox couple $Ce^{+4}/Ce^{+3}$. This is a reversible reaction, making it an oxygen storage material. The reaction moves in the opposite direction in oxygen-free conditions (e.g., under Argon). This facilitates the other electrode reactions with $Ti_4O_7$ and $Co_3O_4$ as discussed below.

Without wishing to be bound by theory, the actual mechanism may well be some combination of the two pathways discussed above, combined with the "defect theory" described above.

Point of Zero Charge

In one aspect, the chosen suboxide used in the anode and cathode has well separated (e.g., greater than 1, between 1 and 4, 1.5) Point of Zero Charge (PZC). PZC refers to the pH established within the adsorbed water as it dissociates. Without being bound by theory, it is believed that this imbalance drives the potential difference in the electrodes. See, e.g., Parks et. al., "The Zero Point of Charge of Oxides," MIT, 1961; "Surface charge characterization of metal oxides by potentiometric acid-base titration, revisited theory and experiment" by Márta Szekeres, Etelka Tombácz, Department of Physical Chemistry and Materials Science, University of Szeged, Aradi vt. 1, 6720 Szeged, Hungary 2012.

Dissolved Oxygen and Water Interaction

Figure 3:
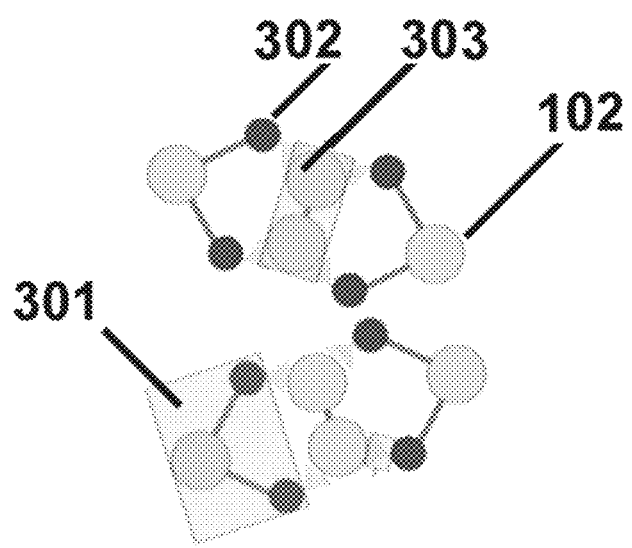
FIG. 3 illustrates how oxygen dissolves in water.

In another aspect, the energy harvester preferably contains small amounts of water in the electrodes, which elicit a response to the presence of oxygen—or conversely, to the removal of oxygen by flooding with argon (0% oxygen). Oxygen does not ionize when dissolved in water, but is held between the water molecules as shown in FIG. 3 where the rectangles 301 highlights the water molecule (oxygen is 102 and hydrogen is 302), and do not represent entities in and of themselves. Oxygen molecule (303) becomes intimately connected to the holding of oxygen diatomic molecules, and therefore, the transport of those molecules from place-to-place. In a conventional energy harvester, this could be considered an "electrolyte" but in the present energy harvester, the electrodes may be separated by nickel-expanded metal, so the transport of charge is within an electrode, not between electrodes. Combined with the understanding in the above paragraphs dealing with the defects in the suboxide crystal structure, one aspect of the charge transport is free flow of charge with relatively small amounts of water.

In certain aspects, the anode may contain between 0.01% and 15% water. In other aspects the anode may contain between 0.1% and 10%, 1% and 8%, or 2% and 5% water. In certain aspects, the second layer may contain between 0.01% and 8% water. In other aspects, the second layer may contain between 0.1% and 5%, 1% and 4%, or 2% and 3% water. In certain aspects, the cathode may contain between 0.01% and 5% water. In other aspects, the cathode may contain between 0.1% and 10%, 1% and 8%, or 2% and 5% water.

In one aspect, a $WO_{2.9}$ and $CeO_2$ separator sits between the anode and cathode, to permit transfer of the charge, possibly on oxygen atoms. This intermediate layer contains cerium dioxide mixed with tungsten suboxide ($WO_{2.9}$), and in one example, in even weights. Tungsten has many oxidation states, but +6 and +4 is the most stable. $WO_{2.9}$ gives the tungsten a valence of +5.8, which is an average over the crystal. $W_{2.9}$ is available from Global Tungsten (gobaltungsten.com).

Figure 4:
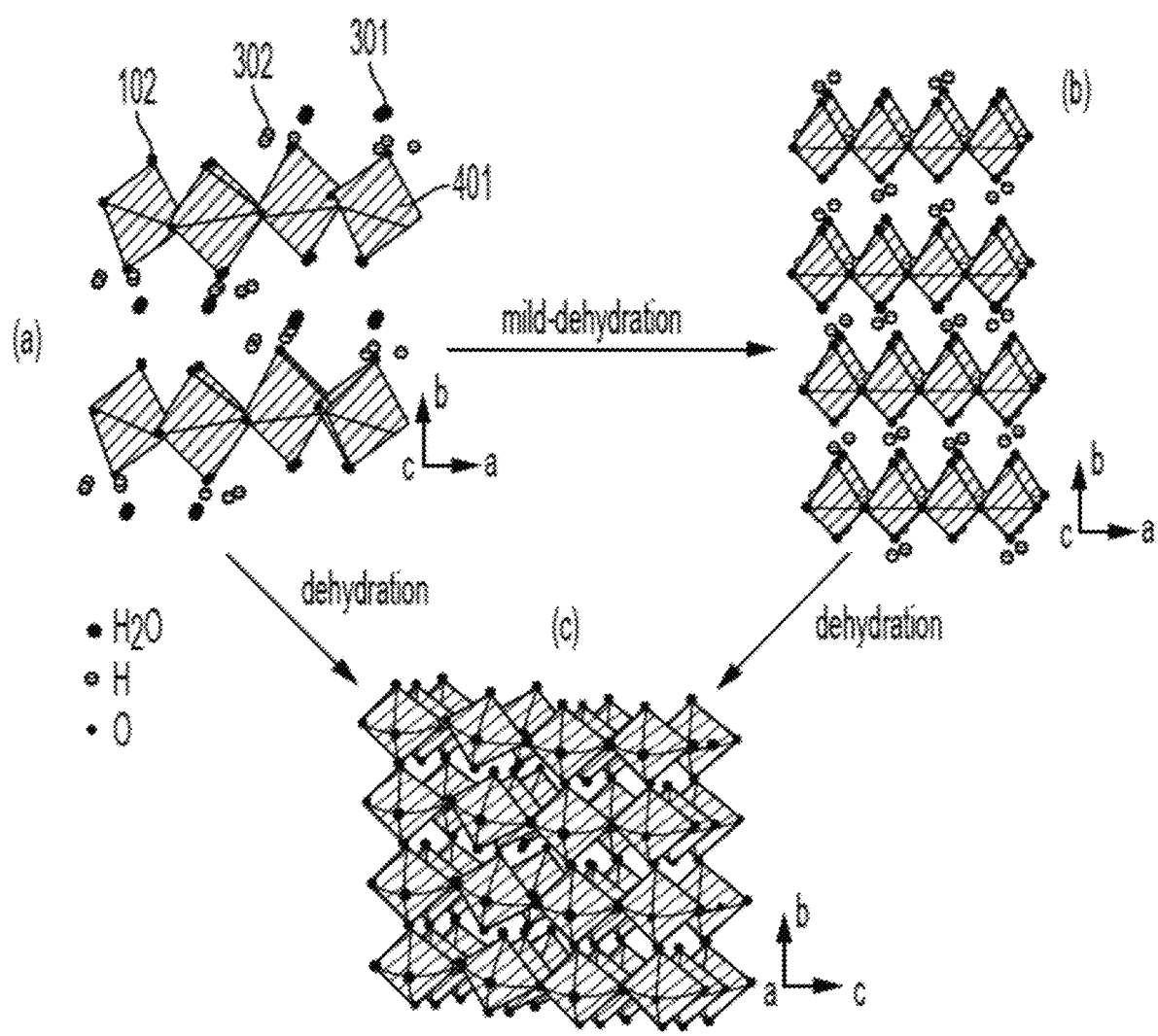
FIG. 4 illustrates the effects of dehydration on the crystal structure of tungsten suboxide $WO_{2.9}$.

FIG. 4 shows the crystal structure of $WO_{2.9}$ and the effect of dehydration on charge transport. The octahedrons shown in 401 are the tungsten orbital fields, the larger black dots 301 represent water molecules, the small black dots 102 represent the singlet oxygen's in the crystals, and the small pale dots 302 represents hydrogen atoms. Without wishing to be bound by theory, it is believed that the water molecules shown in FIG. 4 allow for more movement of the $WO_3$ crystal components. The same structure is present in the case of $WO_x$ (also indicated as $WO_{3-x}$), but some of the charge carrying oxygens are missing from the mass of crystals. FIG. 4 illustrates the effect on the crystal structure as the crystal dehydrates from "a" with sufficient water molecules 301 to the mildly dehydrated "b" and finally the fully dehydrated "c". In one aspect, the energy harvester is made in the dehydrated "c" state, and then allowed to hydrate spontaneously through "b" to "a" in situ.

The following reaction scheme is illustrative:
Reduction ("V"="Vacancy")

$$2(W^{+6}\text{—O—}W^{+6})+4e^-+O_2\rightarrow \quad \text{Equation 10}$$

$$2(W^{+5}\text{—V—}W^{+5})2(O)+4e^-\rightarrow \quad \text{Equation 11}$$

$$2(W^{+5}\text{—O—}W^{+5})+4e^- \quad \text{Equation 12}$$

SUM: $2(W^{+6}\text{—O—}W^{+6})+O_2\rightarrow 2(W^{+5}\text{—O—}W^{+5})+2e^-$

Oxidation $$2(W^{+5}\text{—O—}W^{+5})+O_2\rightarrow \quad \text{Equation 13}$$

$$2(W^{+6}\text{—O—}W^{+6})+(O)+2e^-\rightarrow \quad \text{Equation 14}$$

$$2W^{+5}+O_2\rightarrow \quad \text{Equation 15}$$

$$(W^{+6}\text{—O—}W^{+6})+(O)+2e^- \quad \text{Equation 16}$$

$W^{+6}\rightarrow W^{+4}(W^{+6}\rightarrow W^{+5}$ unknown) $E_o\sim +/-0.91$ volts $E_o$ source: http://hyperphysics.phy-astr.gsu.edu/hbase/Chemical/electrode.html SUM: $2(W^{+5}\text{—O—}W^{+5})+O_2\rightarrow 2(W^{+6}\text{—O—}W^{+6})+2(O)+2e^-$    Equation 17

Summation of the separator reactions $$2(W^{+6}\text{—O—}W^{+6})+O_2\xleftarrow{H2O}2(W^{+5}\text{—O—}W^{+5})+2e^- \quad \text{Equation 18}$$

and $$2(W^{+5}\text{—O—}W^{+5})+O_2\xleftarrow{H2O}2(W^{+6}\text{—O—}W^{+6})+2(O)+2e^- \quad \text{Equation 19}$$

and $$2Ce_2O_3+2O^{-2}\xleftarrow{H2O}4CeO_2+4e^- \quad \text{Equation 20}$$

In one aspect, oxygen enters the separator, and both singlet oxygen and electrons leave to move into the anode. In this aspect, the singlet oxygens react with the cerium oxide to transfer more electrons. Water can have a catalytic role in these events.

Figure 5:
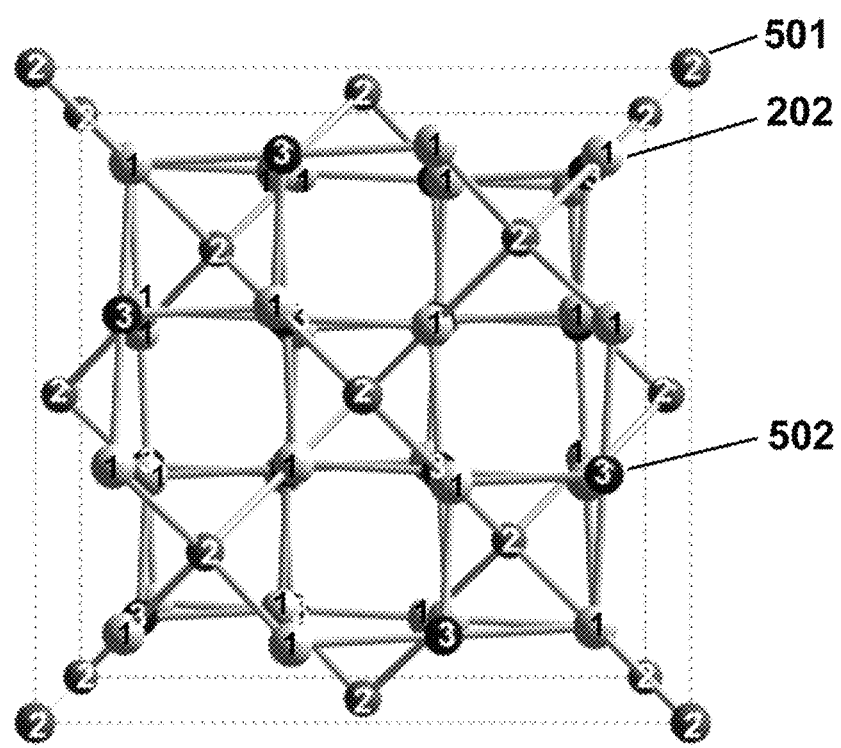
FIG. 5 shows an exemplary crystal structure of cobalt suboxide, a.k.a. cobalt (II,III) oxide ($Co_3O_4$)

In one aspect, the active component of the cathode is cobalt (II, III) suboxide ($Co_3O_4$). FIG. 5 shows the crystal structure of $Co_3O_4$ where the $Co^{+2}$ is shown as spheres #2 (501), $Co^{+3}$ spheres #3 (502), and the oxygen atoms are light colored spheres #1 (202). Cobalt has two oxidation states, +2 and +3, both of which are present in this crystal. The oxygen atoms are loosely bound to the large cobalt atom and electronegative compared to a $Ti_4O_7$ anode. The admixing of $CeO_2$ with $Co_3O_4$ allows the dispersion of charge carrying oxygen atoms, reducing the valence of the cobalt from +2 & +3 in $Co_3O_4$ to only valence+2 in CoO, releasing an oxygen atom to the pool of oxygens associated with the $CeO_2$.

The above reaction results in $CeO_2$—$Co_3O_4$ crystallite reversible redox freeing or absorbing oxygen depending on the direction of oxygen concentration, as shown by the following root equations:

$$O_2+4e^-\rightarrow 2O^{-2} \quad \text{Equation 19}$$

$$2Co_3O_4\rightarrow 6CoO+O_2 \quad \text{Equation 20}$$

Summing these two equations (cation reduced in cathode via $Co^{+2.67}\leftrightarrow Co^{+2}$):

$$2Co_3O_4+4e^-\rightarrow 6CoO+O^{-2} \quad \text{Equation 21}$$

Equation 9 from above:

$$2CeO_2\rightarrow Ce_2O_3+\tfrac{1}{2}O_2 \quad \text{Equation 9}$$

Summing Equations 21 and 9 gives:

$$Co_3O_4+4e^-+2CeO_2\rightarrow 3CoO+O^{-2}+Ce_2O_3+\tfrac{1}{2}O_2 \quad \text{Equation 22}$$

Looking only at the cations:

$Co^{+2.67}+Ce^{+4}\rightarrow Co^{+2}+Ce^{+3}+1.76e^- E_o\sim 1.715$

The above description is an example of how oxygen atoms freely flow from one cation to the other carrying the charge in aspects described herein.

Figure 6:
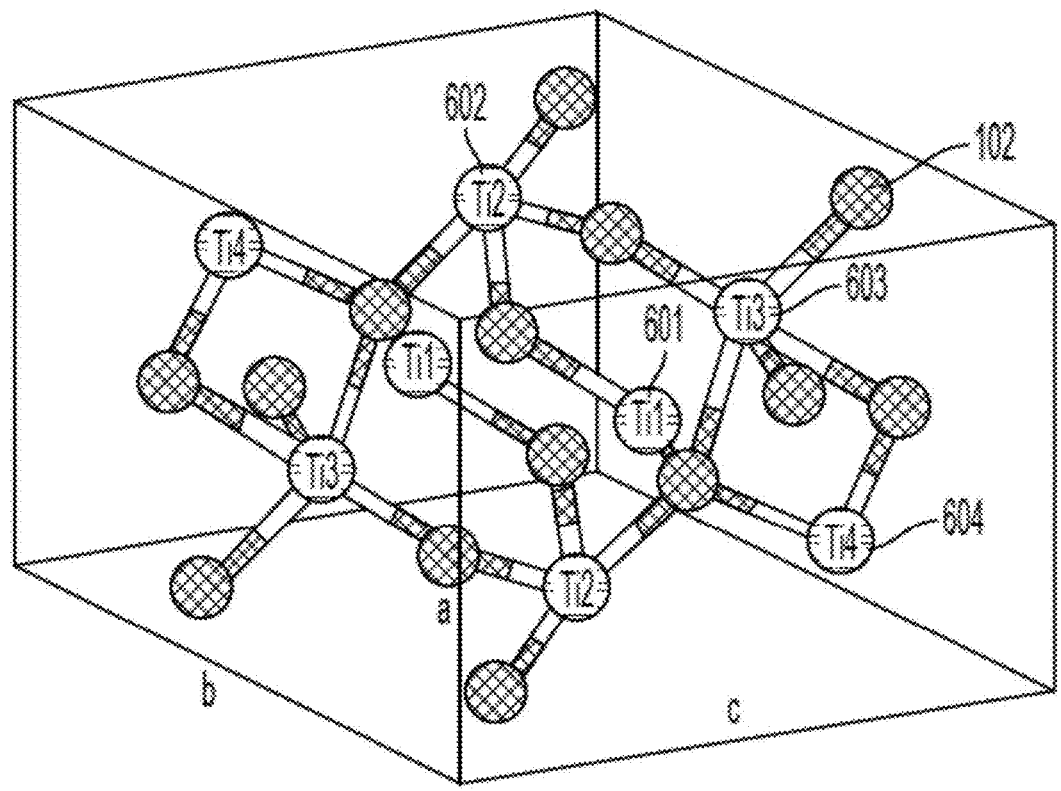
FIG. 6 shows an exemplary crystal structure of $Ti_4O_7$.

In one aspect, the active component of the anode is $Ti_4O_7$ (also expressed as $Ti_nO_{2n-1}$) wherein n is between 4 and 10. $Ti_nO_{2n-1}$ is a member of non-stoichiometric titanium oxides called the Magnéli phases, which exhibit lower bandgaps and resistivities, and which have the highest electrical conductivities reported for $Ti_4O_7$. The atomic structure of this molecule appears in FIG. 6, where the titanium atoms are shown as "Ti1"-"Ti4" for each titanium atom (601-604) in each $Ti_4O_7$ molecule and oxygen shown as "O" atoms (102). With $Ti_4O_7$, titanium has a valence state of +3.5, which is an average value of the crystal since valence states must be an integer. As electrons flow in through the separator, the $Ti_4O_7$ molecule passes them through to the anode conduction band located in the Magnéli phase, then into the anode current collector electrode.

The equations can be summarized as follows:

$$H_2O \rightarrow H^+ + OH^-$$  Equation 23

$$4Ti_2O_3 + 2OH^- + 2O^{-2} \rightarrow 2Ti_4O_7 + H_2O + 2e^-$$  Equation 24

Equation 9 from above (expressed in anodic form):

$$Ce_2O_3 + \tfrac{1}{2}O_2 \rightarrow 2CeO_2$$  Equation 9

Summing Equations 12 and 9 gives:

$$4Ti_2O_3 + 2OH^- + O^{-2} + 2Ce_2O_3 + O_2 \rightarrow 2Ti_4O_7 + H_2O + 4CeO_2 + 2e^-$$  Equation 24

Looking only at the cations:

$$Ti^{+3} + Ce^{+4} \rightarrow Ti^{+3.5} + Ce^{+3} + E_o \sim 1.085$$

Full Energy harvester Flow:

Cathode: $Co_3O_4 + 2e^- + 4CeO_2 \rightarrow 3CoO + 2Ce_2O_3 + O_2 + \tfrac{1}{2}O_2$ Anode: $4Ti_2O_3 + 2OH^- + O^{-2} + 2Ce_2O_3 + O_2 \rightarrow 2Ti_4O_7 + H_2O + 4CeO_2 + 2e^-$ Overall: $Co_3O_4 + 4CeO_2 + 4Ti_2O_3 + 2OH^- + 2H^+ + \tfrac{1}{2}O_2 + 2Ce_2O_3 \rightarrow 3CoO + 2Ce_2O_3 + 2Ti_4O_7 + 2H_2O + 4CeO_2$ Thus, oxygen and water (which dissociates) enter the cathode and the final acceptor of the oxygen is a hydroxyl ion producing water vapor.

Figure 10:
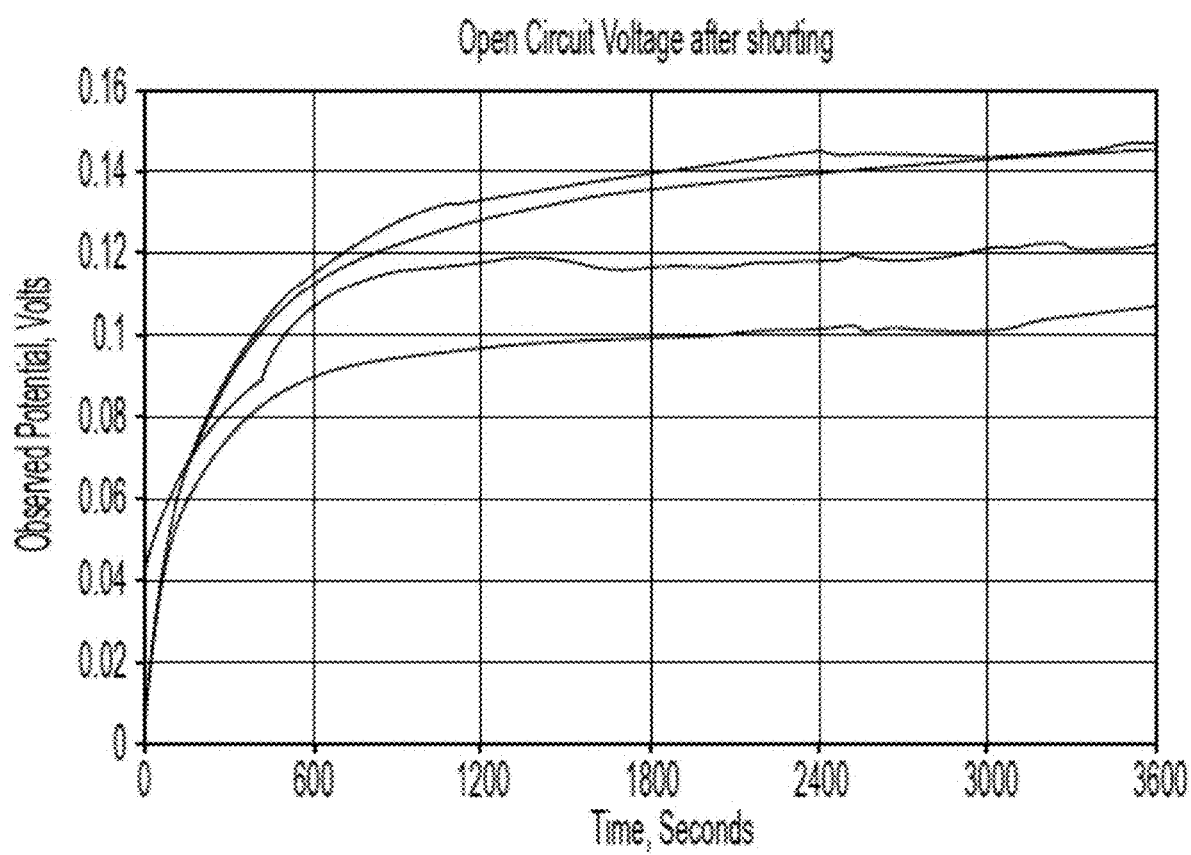
FIG. 10 is a graph showing an exemplary recovery of an energy harvester after shorting.

Table 2 below shows relevant potentials, which are similar to the potentials observed in OCV experiments such as FIG. 10 shows.

TABLE 2

| | | Using standard potential | | |
|---|---|---|---|---|
| A | $Ce^{+4} \rightarrow Ce^{+3}$ | 1.61 V | | |
| B | $Ti^{+3} \rightarrow Ti^{+4}$ | 0.56 V | Oxidized | |
| C | $Co^{+3} \rightarrow Co^{+2}$ | 1.82 V | Reduced | |
| D | $W^{+6} \rightarrow W^{+4}$ | 0.21 V | $W^{+6} \rightarrow W^{+5}$ unknown | |
| | Assuming that the admixture gives the average of the potentials | | | |
| Anode: | B + A = | 1.085 V | $Ti^{+3} + Ce^{+4} \rightarrow Ti^{+3.5} + Ce^{+3}$ | |
| Separator: | D + A = | 0.91 V | $W^{+6} \rightarrow W^{+4}$ ($W^{+6} \rightarrow W^{+5}$ unknown) | |
| Cathode: | C + A = | 1.715 V | $Co^{+2.67} + Ce^{+4} \rightarrow Co^{+2} + Ce^{+3}$ | |
| Energy harvester: | Cathode − Anode = | 0.63 V | | |

Sources of Materials Used:

$Ti_4O_7$, Ti-Dynamics Co. Ltd, Magnéli Phase Titanium Suboxides—N82, www.Ti-dynamics.com.

$WO_{2.9}$, "Tungsten Blue Oxide" http://globaltungsten.com #P005016

$Co_3O_4$ Cobalt (II, III) oxide, www.fishersci.com #AAA1612130

$CeO_2$ Cerium (IV) oxide, www.fishersci.com #AC199125000,

Teflon 30 dispersion "DISP 30", www.fishersci.com #501090482 or www.chemours.com.

PTFE 7CX: www.chemours.com

DAIKIN F104 unsintered Teflon powder

CABOT Vulcan XC72R (GP-3875) carbon V72

ASBURY Graphite Mills "Nano 307"

Cross-Bonded expanded metal 4Ni 5-060 P&Lx4: Dexmet Corporation, 22 Barnes Industrial Rd S, Wallingford, Conn. 06492 (www.dexmet.com)

Nickel 10 mil Shim Stock, (www.mcmaster.com) #9707K79

¾" Silver bezel: (www.riogrande.com) #950272

24 kt Gold Cyanide Plating Solution: (www.riogrande.com) #335082

24 kt Gold sheet for anode: (www.riogrande.com) #608030

Rolling Mill made by Durston (www.durston.co.uk, #DRM F130R)

Example 1: Pellet Electrode

A pellet electrode is made as follows.

Weigh powders: anode is 17% $CeO_2$, 33% $WO_x$, 50% $Ti_4O_7$; solid-state separator is 33.3% $CeO_2$ and 66.7% $WO_x$; cathode is 17% $CeO_2$, 33% $WO_x$ and 50% $Co_3O_4$; binder is 40% by volume Teflon 7c.

Admix the powders in a high-intensity blender. Prepare a ¾" compassion cylinder, and lubricate it with a small amount of Polymist F-5AEx by Ausimont sintered Teflon powder. Place a ¾" cross-bonded expanded metal disk (Dexmet Corp, 4Ni 5-00 P&Lx4) in the bottom of the compression cylinder. Pour the blended powders into the cylinder. Add another ¾" cross-bonded expanded metal disk on top of the powders. Place a stainless steel cover plate over the cylinder. Compress to 5000 Pounds (11,318 psi) and hold for a few seconds. Remove from the cylinder, and measure and record the weight and thickness.

Knowing the density of all the components, the weight and volume is used to calculate the porosity of the resulting pellet. A pressure is chosen that provides good binding of the powders and good porosity. In this example, 5000 pounds was found to be an exemplary pressure.

The pellets are then placed in a humidity chamber, which is at 100% relative humidity for four days, bringing the internal water content to about 5% in the anode, about 3.5% in the separator, and about 0.6% in the cathode.

Figure 7A:
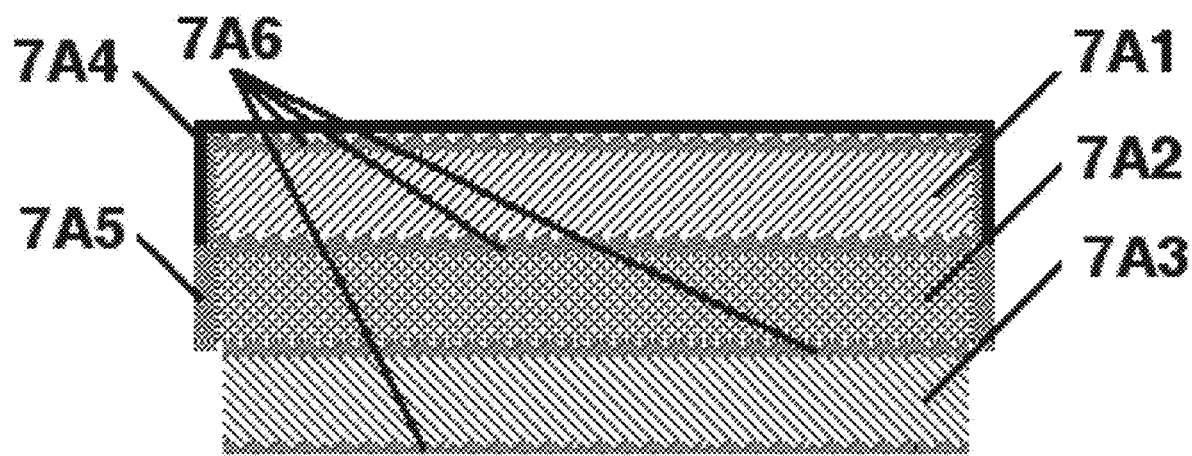
FIG. 7A shows an exemplary physical layout of an aspect of a solid-state energy harvester with multiple layers of expanded metal between electrodes.

FIG. 7A shows the physical layout of an exemplary resulting energy harvester with three electrodes: Anode pellet (7A1), Separator pellet (7A2), Cathode pellet (7A3), and nickel cross-bonded expanded metal (7A6) between each layer with the anode nestled within a gold bezel (7A4) held in with epoxy adhesive (7A5). Each pellet also has nickel expanded metal on each surface (7A6).

The Separator pellet (7A2) is often omitted from the design resulting in a two-electrode design.

Example 2A: Rolled Electrode

An embodiment of a rolled electrode is made as follows:

Weigh powders: anode is 17% $CeO_2$, 33% $WO_x$, 50% $Ti_4O_7$; solid-state separator is 33.3% $CeO_2$ and 66.7% $WO_x$; cathode is 17% $CeO_2$, 33% $WO_x$ and 50% $Co_3O_4$; binder is 40% by volume Teflon 7c. Admix in a high-intensity blender.

Adjust the gap of a 60 mm diameter precision rolling mill made by Durston (www.durston.co.uk, #DRM F130R) to 0.178 mm (0.007"). Rolls must be parallel to a high degree. With the rollers situated in a horizontal position, pour the powder onto the roller nip. Slowly rotate the rollers toward the nip, drawing the powder into the nip and producing a freestanding sheet on the underside of the rollers. Remove the sheet and lay it on a clean sheet of paper. Cut a disk of each sheet using an arch punch, e.g., a "(19 mm) diameter punch #3427A19 from McMaster Carr. In one aspect, the cathode is 1" diameter, the separator is ⅞" diameter and the anode is ¾" diameter to insure no cross electrode shorting. In more refined production situations, the diameters can be the same.

Lay the cathode sheet onto a current collector (e.g., gold or gold-plated nickel or other metal). An intra-electrode current collector may or may not be used over this first sheet. A 10-mil nickel shim stock, flattened nickel expanded metal, or no spacer (sheets in direct contact) may be used if an intra-electrode current collector is used. Place the separator sheet next, then the anode sheet, following the protocol used for the current collector. Place a current collector over the anode.

The resulting energy harvester is assembled into the testing apparatus, e.g., using 40-psi force compression.

Figure 7B:
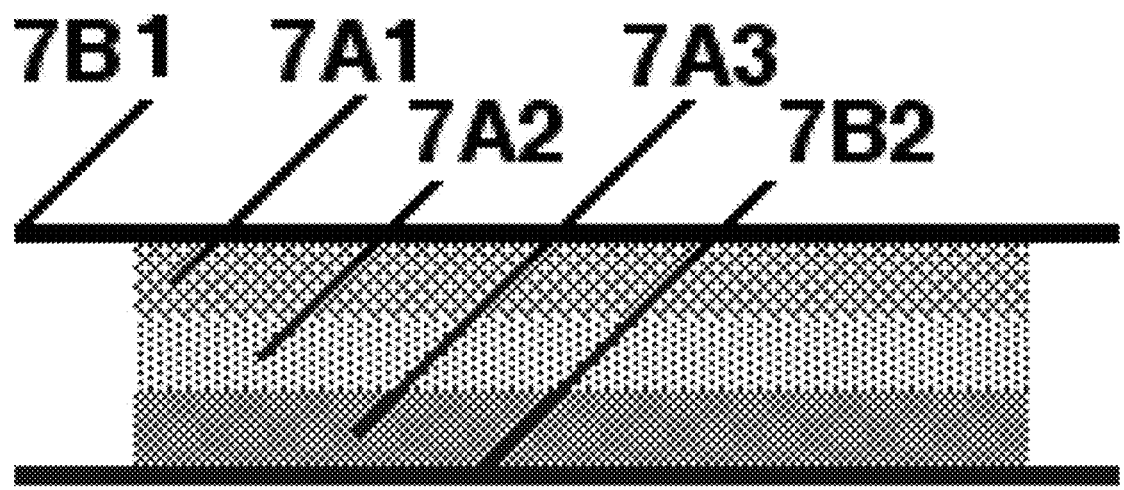
FIG. 7B shows an exemplary physical layout of a six-electrode energy harvester.

FIG. 7B shows the physical layout of a three electrode, thin rolled energy harvester. This example uses no metallic spacers. In FIG. 7B, there is an anode layer 7A1, an anode layer 7A1, a separator layer 7A2 and a cathode layer 7A3 sandwiched between an anode current collector 7B1 and a cathode current collector 7B2. None of these example energy harvesters contain an insulating separator as most liquid electrolyte energy harvesters do.

The Separator layer (7A2) is often omitted from the design resulting in a two-electrode design.

Example 2B: Rolled Electrode

To resolve sticking problems with the rollers described above, another embodiment of a rolled electrode was made as follows:

Weigh powders: anode is 17% $CeO_2$, 33% $WO_x$, 50% $Ti_4O_7$; solid-state separator is 33.3% $CeO_2$ and 66.7% $WO_x$; cathode is 17% $CeO_2$, 33% $WO_x$ and 50% $Co_3O_4$; binder is 40% by volume Teflon 7c. Admix in a high-intensity blender.

Use a 60 mm diameter precision rolling mill made by Durston (www.durston.co.uk, #DRM F130R) (801 of FIG. 8) situated in a vertical position (801). Cut two pieces of 1/16" (1.58 mm) sintered Teflon sheeting (McMaster Carr #8545K13) or thicker about 100 mm wide (about 4 inches) and about 150 mm long (about 6 inches) (802). Adjust the roller mill gap to be 2 times the thickness of the Teflon sheet plus 0.007" (0.178 mm). Alternatively, the rollers can be pressed together pneumatically rather than under a constant gap. This way, the thickness of the powder going into the mill can vary more than if using a constant gap. A pair of 4-inch pancake cylinders (Mead Fluid Dynamics SS-400X1.125-FB), under 50-psi giving 1257 pounds force can be used. About 25 psi (630 Pounds Force) can be used to produce a strong sheet, while maintaining porosity in a useful range (e.g., 0% to about 50% porosity).

Pour the well-blended powder on one sheet (803), doctoring between stainless steel rods to a constant thickness and width, and place the second sheet over it. Slowly rotate the rollers toward the nip, drawing the Teflon sheets and powder into the nip and producing a freestanding sheet between the Teflon sheets. The Teflon sheets (802) may be replaced with Teflon coated metal sheets of the same size cut from a cookie sheet, for example. Remove the electrode sheet (804) using a safety razor or other sharp instrument and lay it on a clean sheet of paper. Cut a disk of each sheet using an arch punch, e.g., a ¾" (19 mm) diameter punch (e.g., #3427A19 from McMaster Carr). Lay the cathode sheet onto a current collector (e.g., gold plated brass or nickel). A current collector can optionally be used over this first sheet. A 10-mil nickel shim stock, flattened nickel expanded metal, or no spacer (sheets in direct contact) may be used. Place the separator sheet next, then the anode sheet, following the protocol used for the current collector. Place a current collector over the anode; here, gold plated nickel or brass shim stock was used. The resulting energy harvester is assembled into the testing apparatus, e.g., using 40-psi force compression.

In another aspect, the cathode is 1" diameter, the separator is ⅞" diameter and the anode is ¾" diam. In this aspect, cross electrode shorting is reduced or eliminated. In another aspect, the diameters can be the same.

The separator layer can be omitted with the anode and cathode simply placed in immediate contact with each other. In another aspect, the anode and cathode have a concentration gradient of materials to produce, for example, higher impedance near the interface between the electrodes.

In some aspects having carbon (graphite or carbon black) added to the anode and the cathode electrodes, no additives are added to the SSE layer situated between the anode and cathode. The separation of charge in this aspect is accomplished by using the higher impedance of the SSE layer. In a further aspect, no load can be lower than the total output impedance of the finished unit.

In many energy harvester builds, the cell is placed within a plastic enclosure. Exemplary plastic enclosures have been made from polyacrylate and polycarbonate, but could be composed of any non-conductive plastic material. The adhesive used has been "airplane glue" when using polycarbonate or Methyl Ethyl Ketone (MEK) when using polyacrylate. In one aspect, the functioning cell is enclosed in a space with a gas inlet and outlet for increased control of the gaseous reactants, and to make the resulting cell more robust. When using an enclosure, the gases are pumped across the electrodes at a rate from 5 to 300 ml/minute depending on the test involved with an exemplary rate of 50 ml/minute per cell.

Example 3: Testing

The test apparatus holds the energy harvester under 125 pounds force onto anode and cathode current collectors, which are gold-plated, nickel 200 or brass resting on cast acrylic supports. Testing was done using a Solartron S1287 Electrochemical Interface and a Solartron S1250 Frequency Response Analyzer, but many other test apparatuses would work as well. The pellets were tested as individuals and as an energy harvester between gold electrodes. The entire apparatus was situated inside a plastic bag for gas environment experiments. Typically, tests can be conducted in air (20% O2), 100% O2 and Argon (0% oxygen). When testing the assembled energy harvester, the cathode is used as the Working Electrode and the Working Reference. The anode is the Counter Electrode and the Reference Electrode. One would expect negative currents when shorting or potentiostatic discharges of the energy harvester in this example When the Energy Harvesting cell is built into an air-tight enclosure, then gasses are passed into the cell via a port at one end of the enclosure with the gasses escaping from an exhaust portal. Typically, tests were conducted in air (20% O2), 100% O2 and Argon (0% oxygen).

Tests include the set below:

Open Circuit Voltage (OCV) for 1 minute

AC Impedance Spectroscopy from 1 MHz to 1 mHz with 10 data per decade.

The units are normalized for physical conditions by measuring the thickness of the compressed electrode or the pellet thickness and knowing the surface area.

Polarization curve from OCV+0.25 to zero volts at 1 my per second scan rate.

This gives us the Exchange Potential ($E_o$), Limiting current density and power density.

Cycling Voltammogram from OCV to +1.0 volt, to −1.0 volt, cycling five times at 50 mV/sec. The data resulting from this included:

$R_{functional}$, is calculated by taking the Maximum current at +1 volt and the minimum current at −1.0 volts and calculating the slope between those two points as a resistance by using Ohms law ($R_{functional}$=dV/di).

Hysteresis at 0 volts: If the electrons are consumed and released during the cycle as they are with an electrochemical system or a capacitive system, then there is a spread in the current when the direction of potential is rising as compared to falling. In essence, the electrons are being consumed or release as opposed to simply passing through the system (as they are through a resistor). The greater this hysteresis is, the better the crystals are for storage or release of energy. The current density spread at positive and negative directions is the hysteresis which can be measured as the voltage at zero current.

Example 4

$CeO_2$ is used in equal parts in all three electrodes: the $Ti_4O_7$ Anode, the $WO_{2.9}$ separator, and the $Co_3O_4$ cathode. $CeO_2$ is admixed with 10% Teflon 7c by DuPont. Each pellet contains 2 grams of the active material and a pure nickel expanded metal (from Dexmet) on both surfaces. The pellets are made as described above and held in 100% relative humidity for four days giving moisture content of 3.7% for the anode, 1.6% for the separator, and 0.5% for the cathode pellet. To assemble the energy harvester, the anode pellet is adhered with 5-minute epoxy resin at its perimeter to a heavily gold-plated silver bezel while held under 40 PSI compression to ensure good contact with the gold. The separator is sealed around its perimeter with epoxy resin; this ensures that all oxygen must be transported from the Cathode through the separator.

Figure 9:
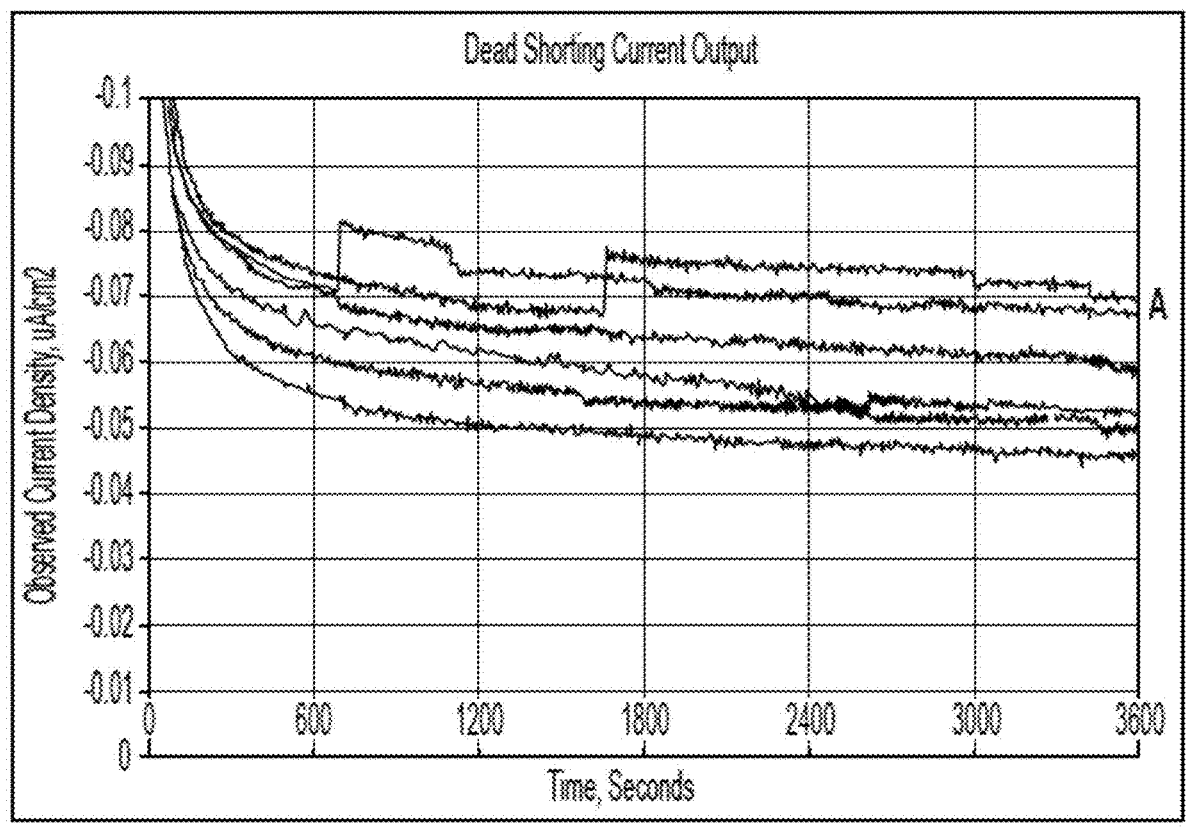
FIG. 9 is a graph showing an exemplary current density during shorting of an energy harvester.

This pellet design energy harvester as described in FIG. 7A above was then dead shorted for an hour and allowed to recover for an hour over eight cycles all while in an oxygen environment. The chamber was not hermetically sealed, so oxygen diffuses out and nitrogen diffuses in, but at very low rates. FIG. 9 shows the current density during the shorting for the many discharges. It should be noted that all discharge tests have a reversed vertical axis because the cathode is considered to be the working electrode, so currents are negative and open circuit voltages will be positive. During the highest two lines (A), oxygen was introduced at about 700 seconds and the other at about 1600 seconds, oxygen is reintroduced and the jump in performance is noted. All other lines are in air (20% oxygen).

After each shorting described above, the energy harvester was allowed to rest for one hour, in oxygen. FIG. 10 shows the energy harvester recovery. The energy harvester consistently recovered after dead shorting—even after 25 hours of continuous shorting.

Figure 11:
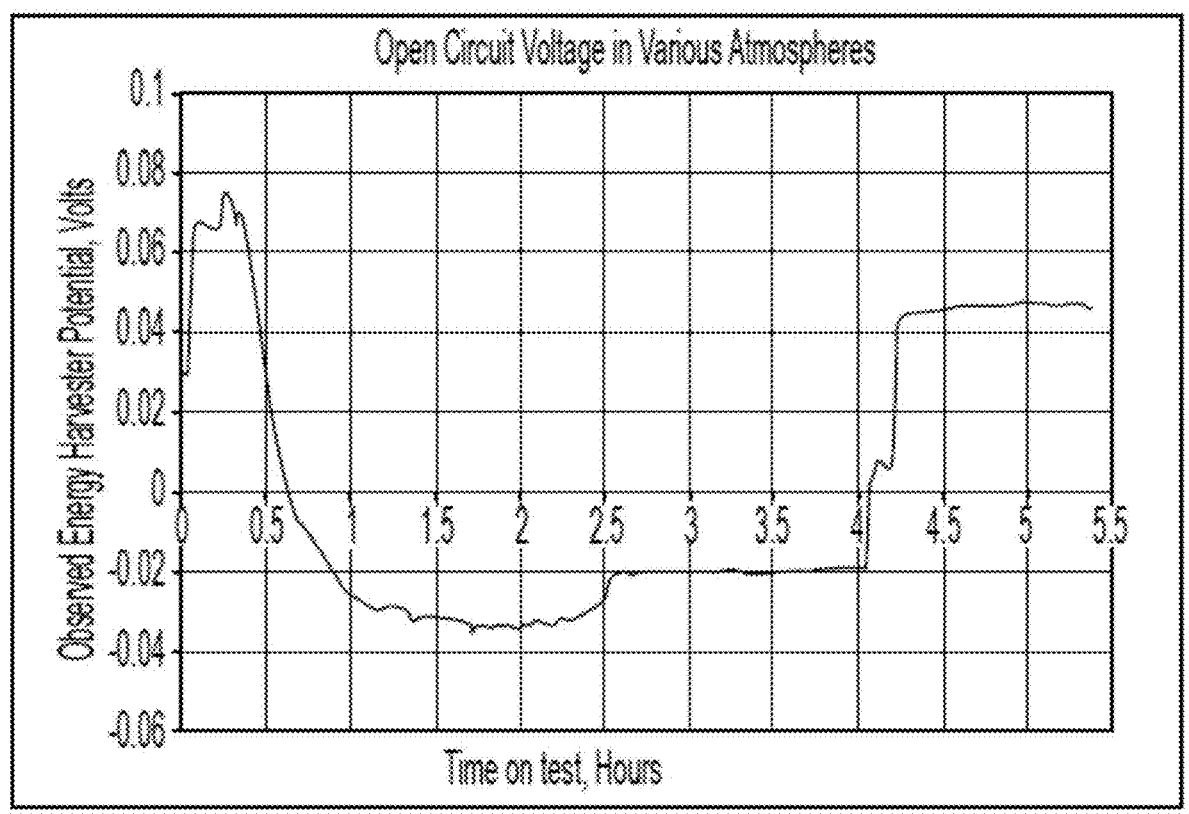
FIG. 11 is a graph showing the exemplary results of a non-discharging energy harvester in oxygen, argon (0% oxygen), and air after shorting recording the Open Circuit Voltage (OCV)

Next, the energy harvester was allowed to rest in various atmospheres. FIG. 11 shows the results of this experiment the energy harvester started in air (20% oxygen), then after about 5 minutes, the atmosphere was changed to pure oxygen and the current density rose from about 30 mV to about 70 mV. Then, at about 20 minutes, the atmosphere was changed to pure argon (0% oxygen) and the potential dropped to zero, then even below that. Next, at about 4 hours, the atmosphere was returned to open air (20% oxygen) and the potential returned to about 45 mV. This shows the strong effect of external gasses on the performance of this energy harvester.

Figure 12:
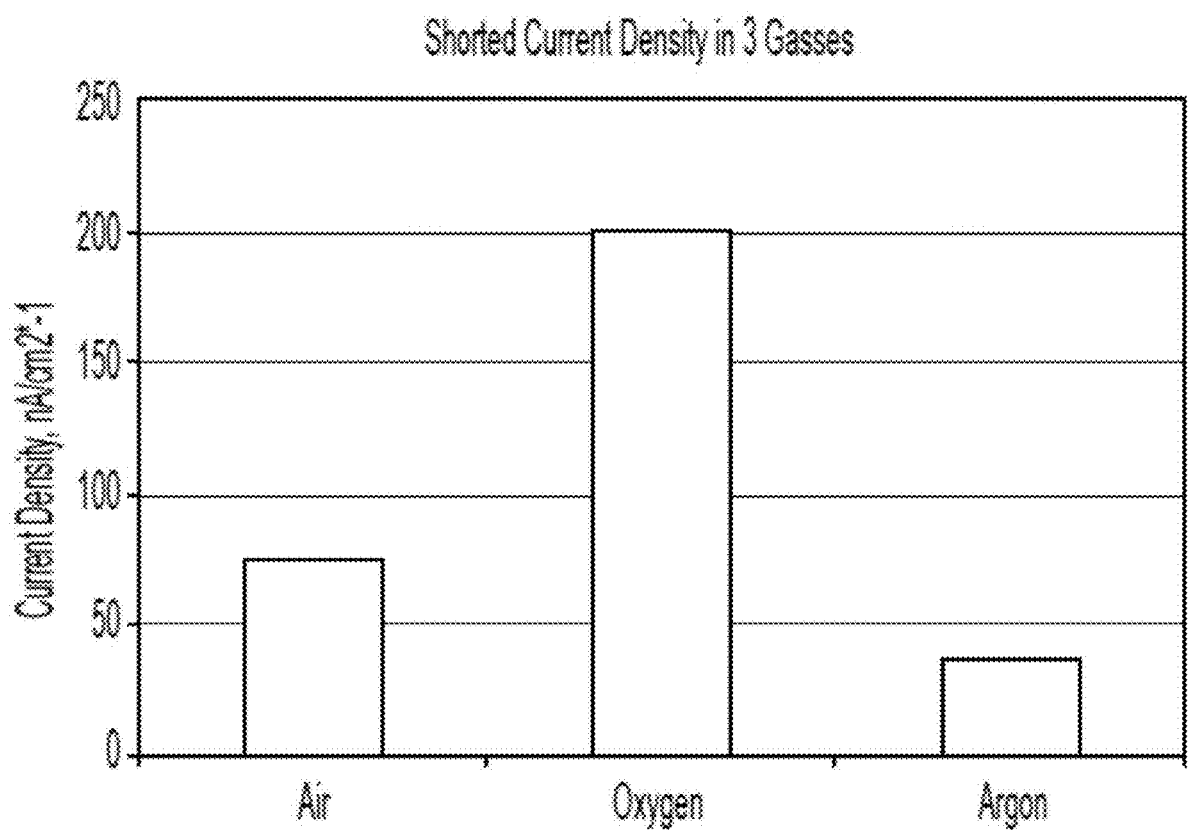
FIG. 12 is a graph showing an exemplary shorted current density in air, oxygen and argon (0% oxygen)

Next, a dead short was done in the various gasses, and FIG. 12 shows the resulting current densities under the three gas environments as a bar graph. The currents are cathodic, resulting in negative values, thus requiring multiplying by −1 as shown in FIG. 12. A strong effect of the atmospheric presence of air is seen in the first bar, then in oxygen (second bar) and finally in argon (0% oxygen) (third bar).

Figure 13:
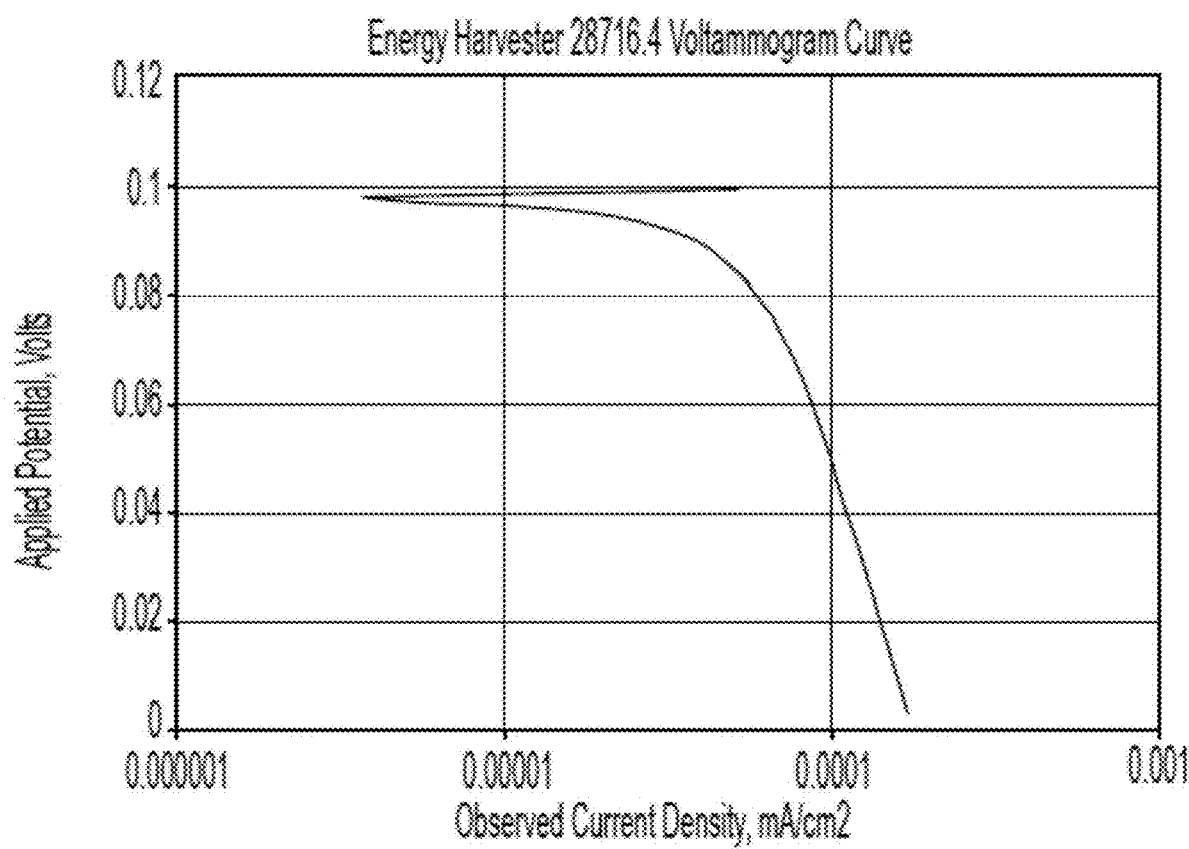
FIG. 13 is a graph showing an exemplary Voltammogram for a dead-shorted energy harvester after 48 hours rest in air.

FIG. 13 provides a voltammogram for the energy harvester 28716.4 (14 Oct. 2016, cell #4) showing a current density of 170 uA/cm$^2$ and an exchange potential of nearly 100 mV after allowing the energy harvester to rest for 48 hours in air. The voltammogram also shows 5 nW/cm$^2$ at 0.066 volts. This data is not impedance compensated.

Figure 14:
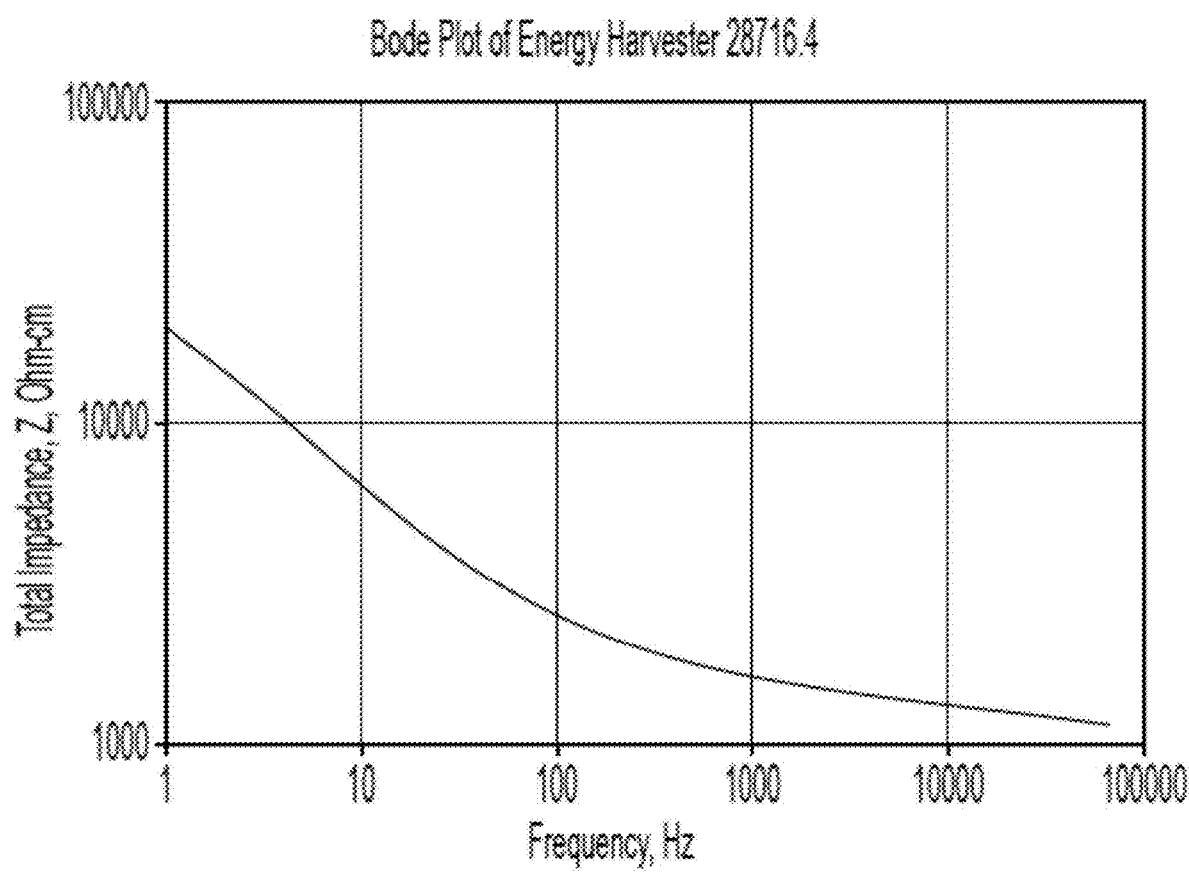
FIG. 14 is a graph showing the AC impedance of an exemplary solid-state energy harvester.
Figure 15:
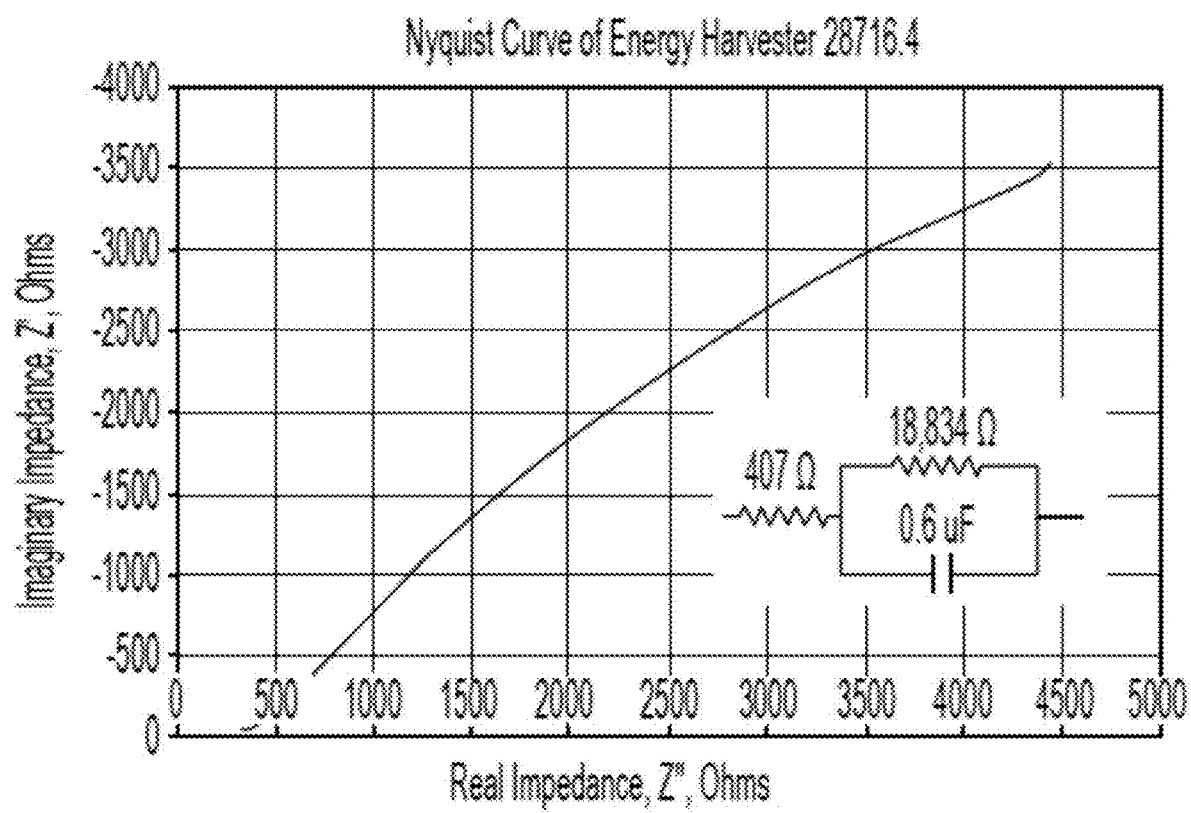
FIG. 15 is a graph showing a Nyquist plot of an exemplary solid-state energy harvester.

FIG. 14 shows the AC impedance of this energy harvester is acceptably low. The compression of the pellet and the nickel cross-bonded expanded metal current distribution both help the impedance issue. FIG. 15 is a Nyquist plot of this energy harvester, showing a large charge-transfer resistance ($R_{ct}$) of 18.8 kΩ.

Example 6: Excluding Water as Liquid Electrolyte

Figure 16:
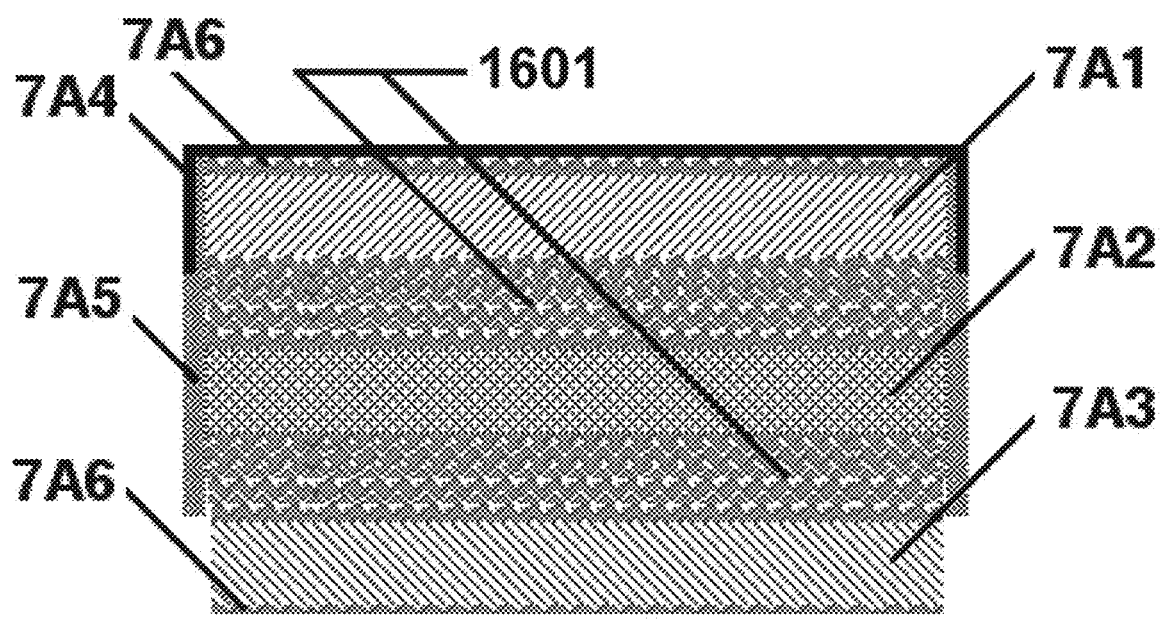
FIG. 16 shows an exemplary solid-state energy harvester with nickel expanded metal between all electrodes.

Water absorption improves functionality. To test whether water is a liquid electrolyte, an energy harvester was constructed using five (5) layers of dry nickel expanded metal inserted between the electrodes of FIG. 16 showing the anode (7A1), 5 expanded metal disks (1601), separator pellet (7A2), five more expanded metal disks (1601) and cathode pellet (7A3). The source for the electrodes was the well-tested energy harvester above. Then, while under pressure, the anode and separator was re-epoxy sealed (7A5) from any external contact with air, leaving the cathode pellet (7A3) exposed to the air. The energy harvester was re-assembled and tested. In this example, electrons and gasses, but not ions, are allowed to pass between the electrodes. The pellets were made according to the Example 1 above.

Figure 17:
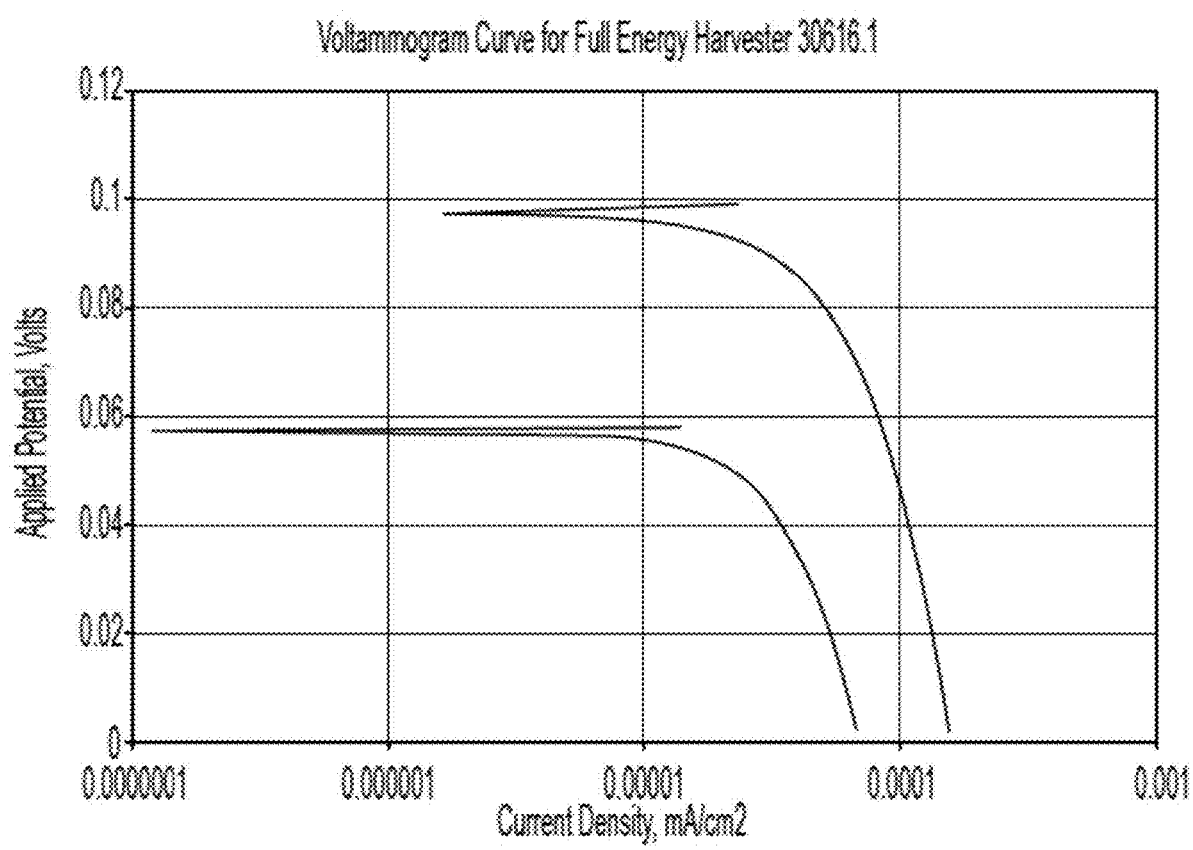
FIG. 17 is a graph showing a Voltammogram for an exemplary solid-state energy harvester.

FIG. 17 shows two Voltammograms of these energy harvesters 30616.1 (2 Nov. 2016, cell #1). The top line is with electrodes nestled together and the lower line shows the performance with 5 expanded metal disks separating each electrode. Even without any possible ion movement between electrodes, the energy harvester performed, demonstrating that such ion movement is not required, and charge is indeed passed vie electrons and perhaps on charged gas molecules, but not as ions.

Figure 18A:
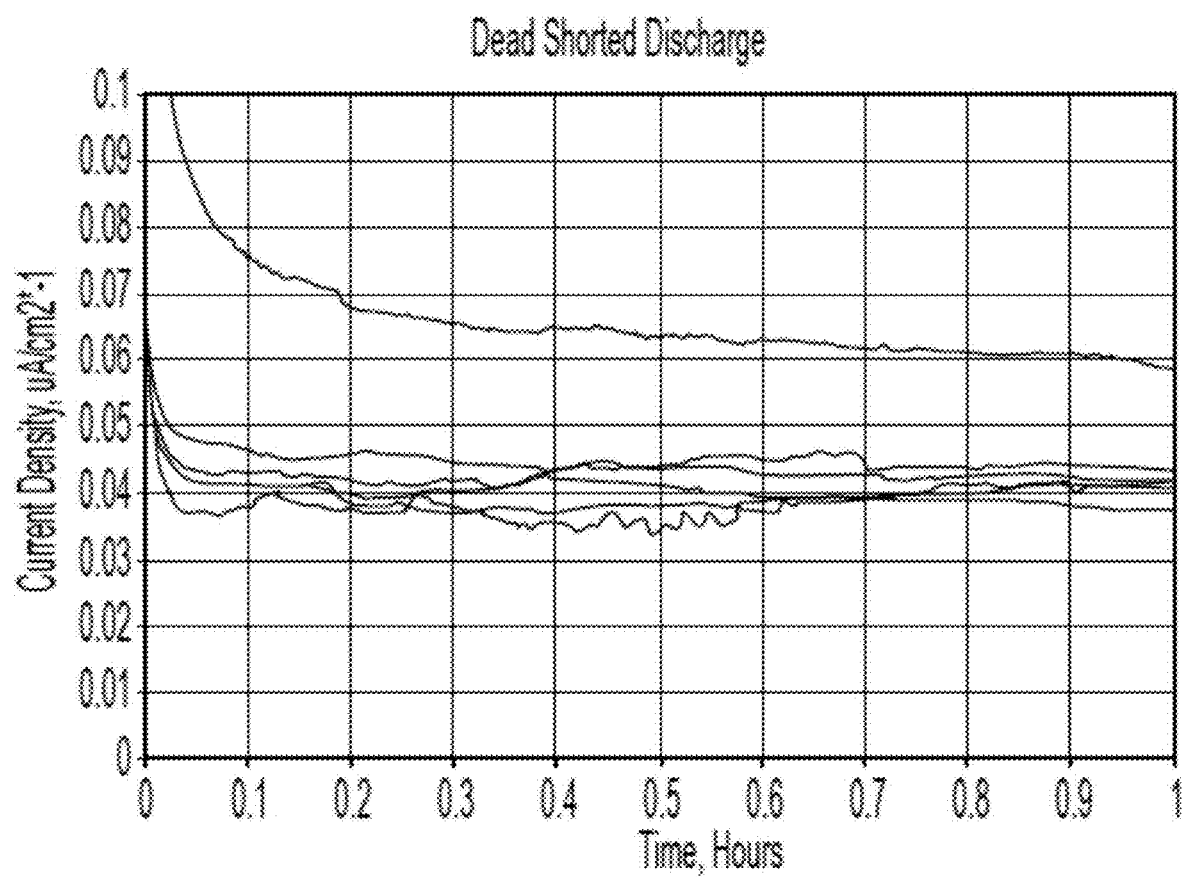
FIGS. 18A and 18B are graphs showing shorted discharges and open circuit voltage ("OCV") spontaneous recharges for an exemplary solid-state energy harvester.
Figure 18B:
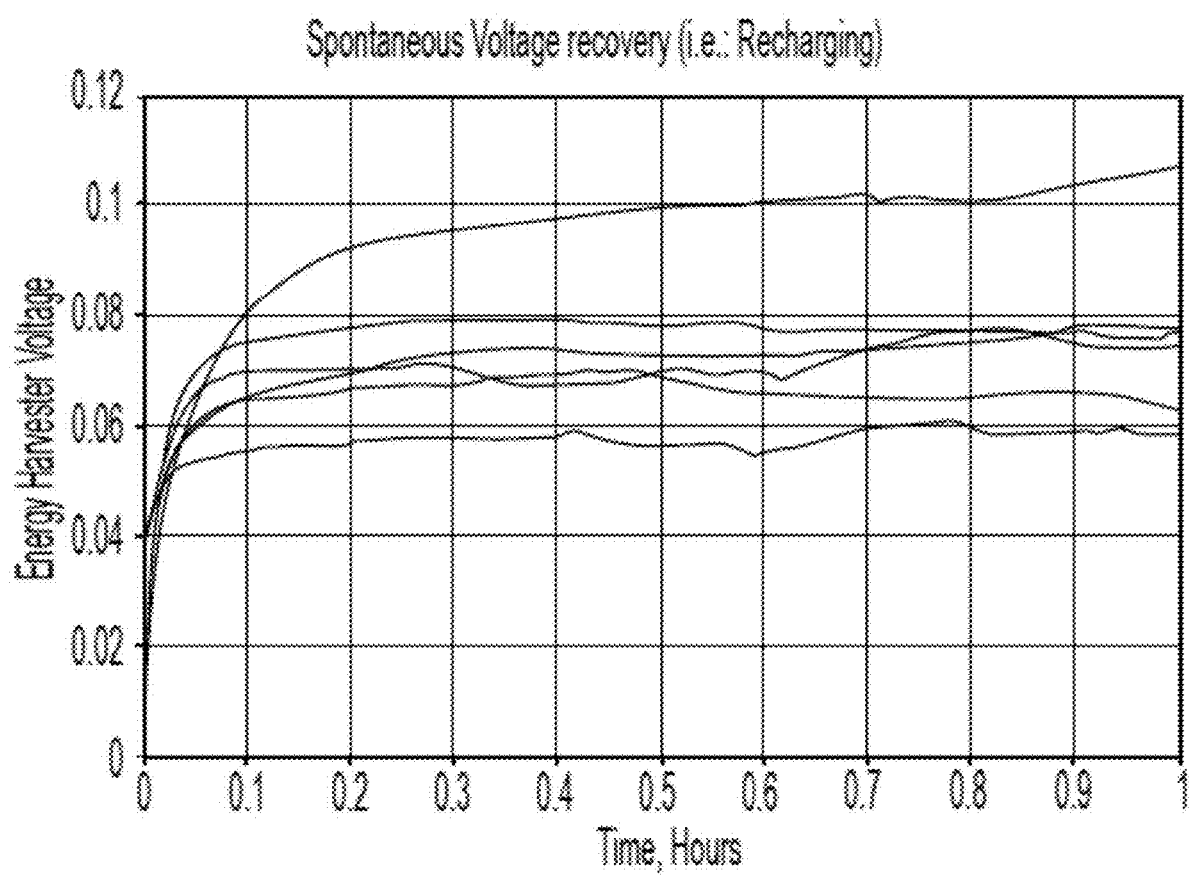

FIGS. 18A and 18B are graphs of a set of shorted discharges and OCV spontaneous recharges all done in air (20% oxygen). The discharge set is shown in FIG. 18A where the top line is the energy harvester with the electrodes in intimate contact and the lower set of lines shows performance with the five layers of expanded metal placed between the electrodes. Clearly, performance continues without ionic transport, but only electrons and perhaps charged gasses.

FIG. 18B is the same set, but for the voltage recovery after one hour discharges. Again, the top line is the energy harvester with electrodes in contact with one another and the lower set are several recharges with the electrodes physically separated from one another. Again, the performance is clear even with no ionic transport of charge. This energy harvester transfers charge only vie electrons.

These experiments with electrodes isolated one from the other, but allowing electrons and gasses to pass freely, demonstrate that charge is being passed between the electrodes using only electrons or charged gasses. The ionization of oxygen occurs within the individual electrodes (using water vapor as a reagent), with oxygen being passed as a gas as electrons move from each cathode toward the anode.

The increased performance when assembled in closer proximity of the electrodes to each other is a physical advantage, not an electrochemical advantage.

Without being bound by theory, it is believed that water present in the energy harvester acts not as an electrolyte, but rather as a reagent within individual electrodes.

Example 7

Figure 8:
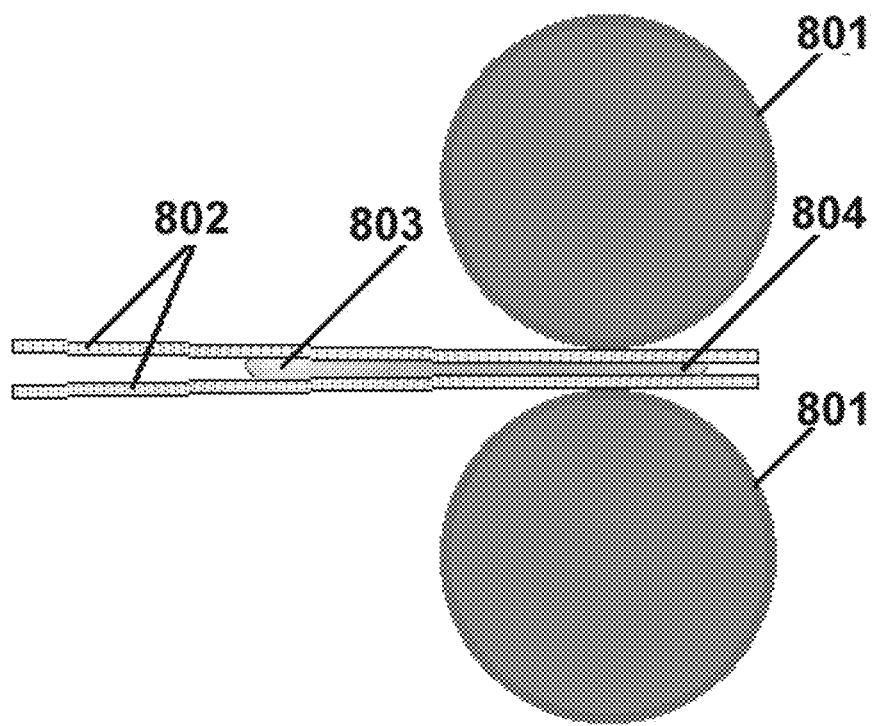
FIG. 8 illustrates the use of a rolling mill to make a rolled electrode.
Figure 19:
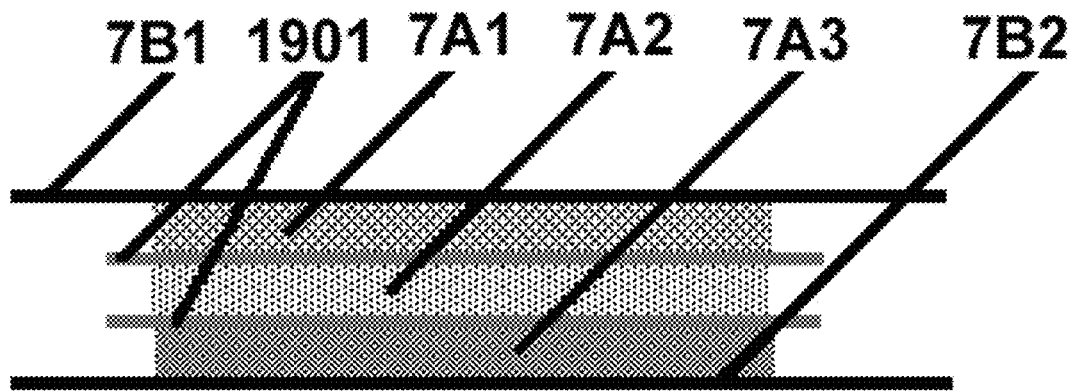
FIG. 19 is an illustration of an exemplary 3-layer thin-film solid-state energy harvester.

FIG. 19 shows a 3-layer thin-film energy harvester was prepared as described in Example 2A and 2B above using the rolling mill as described in FIG. 8 (run number: 36416). Gold plated 10-mil brass shim stock 1-inch diameter disks (7B1 and 7B2) placed between each thin layer anode (7A1), separator (7A2) and cathode (7A3) between a pair of gold plated current collector (7B1 and 7B2) sheets were used.

Figure 20:
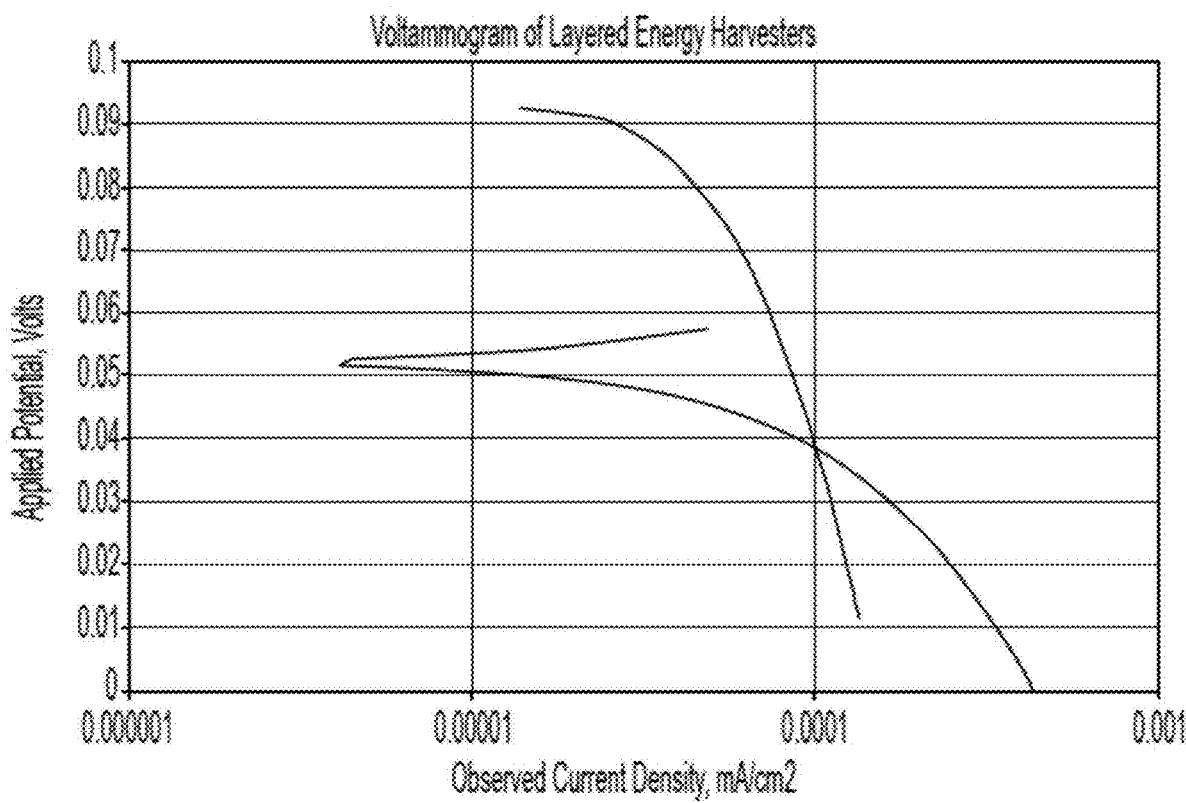
FIG. 20 is a Voltammogram of an exemplary solid-state energy harvester.

FIG. 20 shows a voltammogram of the separated-electrode energy harvester described in FIG. 19, with the curve from the 3-layer thin rolled electrode energy harvester, wherein the electrodes were simply pressed on top of each other with no spacer. The top line had gold plated brass spacers between the electrodes. The lower line was built with no spacers at all, but electrodes pressed together. It showed a lower the voltage, but a decade higher current density. Both energy harvesters performed, but with different resulting parameters. Total blocking of liquids, ions and gasses clearly did not hinder performance, demonstrating that this energy harvester transfers charge using only electrons.

Figure 21:
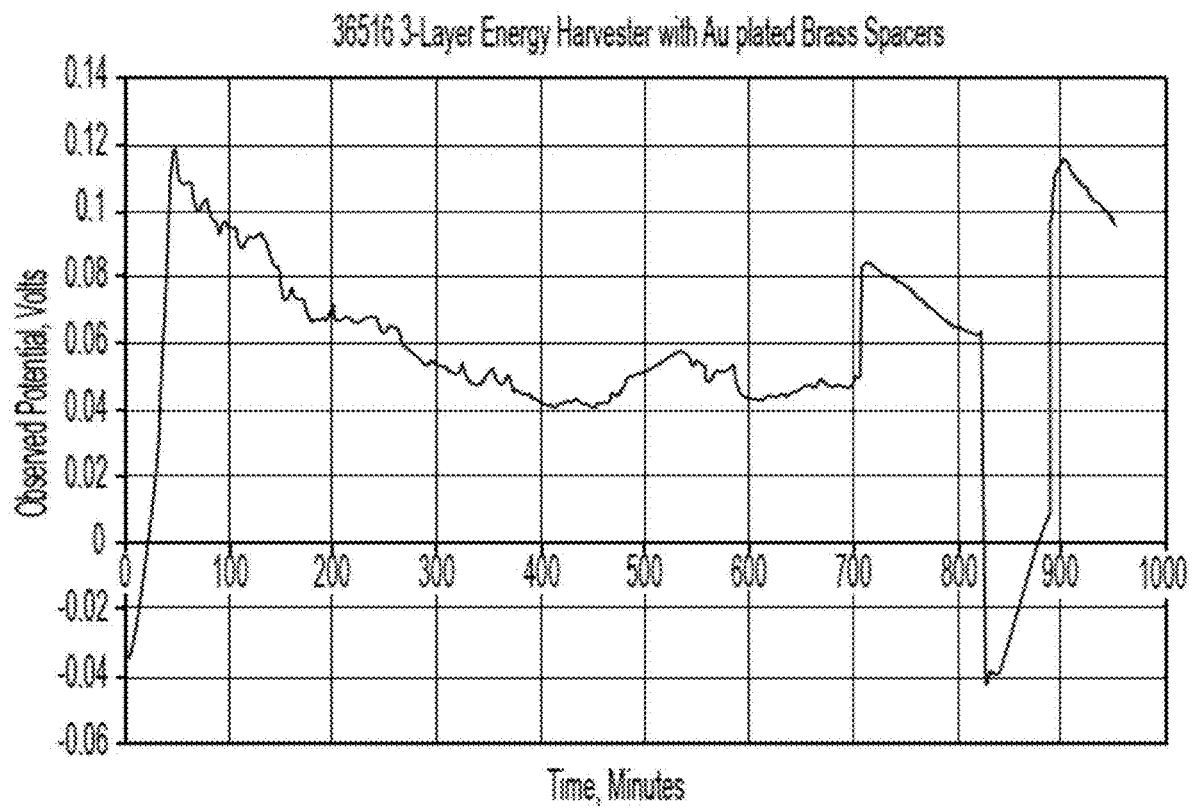
FIG. 21 is a graph showing along Open Circuit Voltage (OCV) of an exemplary solid-state energy harvester.

FIG. 21 shows along OCV of this thin electrode energy harvester with solid spacers between electrodes for cell 36516 (31 Dec. 2016). This energy harvester was exposed to oxygen in the beginning where the OCV reached 0.12 volts, then sagged a bit, but still held a voltage. T about 700 minutes, it was given more oxygen and the performance improved again. It should be noted that the environmental "chamber" is simply a plastic bag with cable ties closing the top. This is not a hermetic seal by any means. So atmospheric gasses do diffuse in over time. At about 825 minutes, argon was made to fill the bag and a precipitous drop in performance was observed. At about 875 minutes, oxygen was reintroduced to the "chamber" and performance again rebounded. These results show that the energy harvester still functions whether the electrodes are sandwiched together or separated with an impervious layer of nickel. This indicates that one could roll or paint the active ingredients onto a metal foil to increase the surface area.

Example 8

Figure 22:
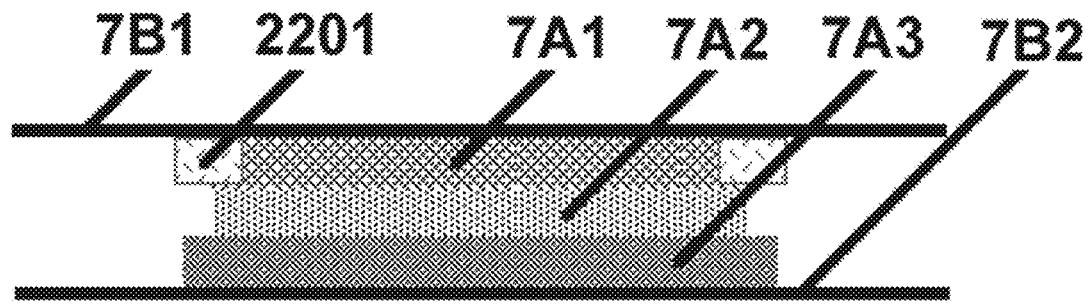
FIG. 22 is a cross-section of an exemplary solid-state energy harvester.

FIG. 22 shows a cross-section of a 3-layer energy harvester made using the Teflon rolling mill method described above in Example 2B. In this case, each electrode is a different diameter with the bottom layer being the cathode at 1" (25.4 mm) diameter (7A3), the separator being ⅞" (22.2 mm) (7A2), and the anode being ¾" (19 mm) (7A1). A paper insulator is made to be sure the current collector does not short the anode and separator (2201) to the current collector disks (7B1 and 7B2). This ensures that there is no accidental shorting between the anode and the cathode or even direct shorting of the energy harvester. The energy harvester was subjected to various tests, where it performed the best of all previous tests.

Figure 23:
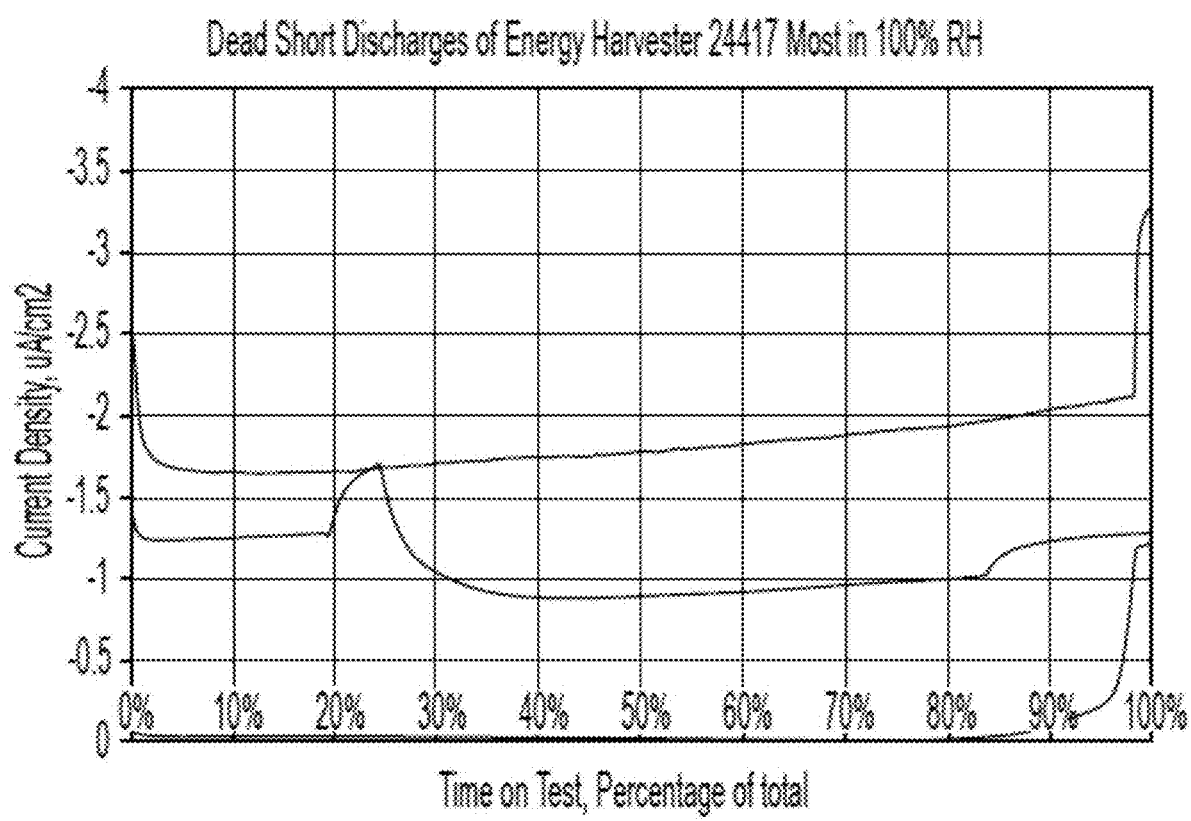
FIG. 23 is a graph showing current density for three 24-hour tests of an exemplary solid-state energy harvester.

Shorting tests: FIG. 23 shows the current density for three 24-hour dead shorting tests of cell 24417 (1 Sep. 2017). The current density is now much higher than previous tests using the thin electrodes with progressively smaller electrodes to prevent accidental shorting between electrodes. Several conditions, such as changing the gasses can be seen in these lines. Consider the lowest line, which was the initial discharge. The energy harvester was dry after manufacturing. Near 90% of the test, it was exposed to 100% relative humidity (RH) and its performance improved considerably. The next line above that, shows a continuation of the same energy harvester in air and 100% RH until 20% of the test where pure oxygen is introduced. At about 25%, pure argon was introduced to remove all oxygen from the test chamber. At 85%, atmospheric air was introduced (20% oxygen). The top line was after house of rest in 100% RH air and at the end of the 24-hour test, oxygen was introduced, giving a considerable increase to the current density output. The effect of atmospheric oxygen is clearly evident in the resulting open circuit voltage with oxygen giving the highest value.

Figure 24:
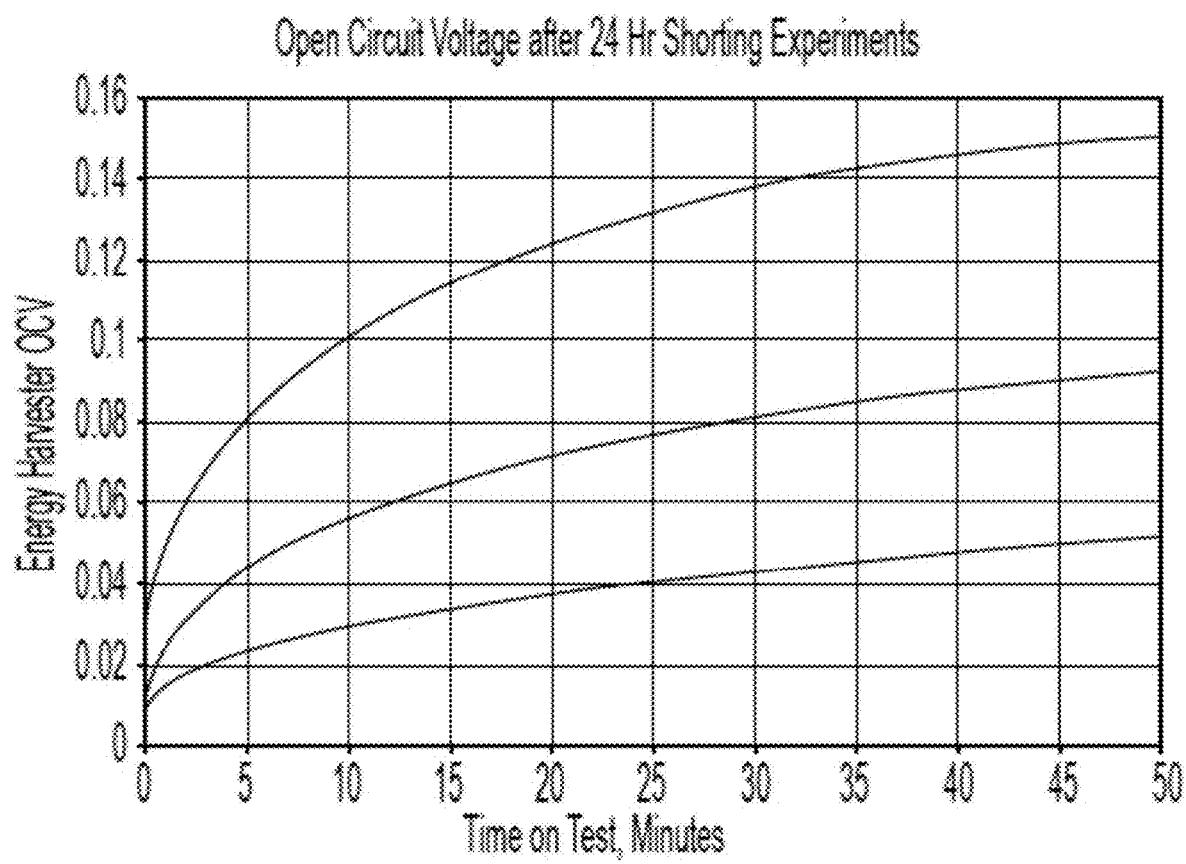
FIG. 24 is a graph showing OCV recovery after three tests of an exemplary solid-state energy harvester in different environmental gasses including air, oxygen and the inert gas argon (0% oxygen)

OCV Recovery Testing: FIG. 24 shows the OCV after each of the long discharges in FIG. 23. The lowest line shows OCV recovery in argon (little oxygen). Remember that the test chamber is not fully sealed from contaminating oxygen from the air. The middle line is in air and the top line is in 100% oxygen. Again, clearly, the atmospheric gasses are playing a large role in performance.

Figure 25:
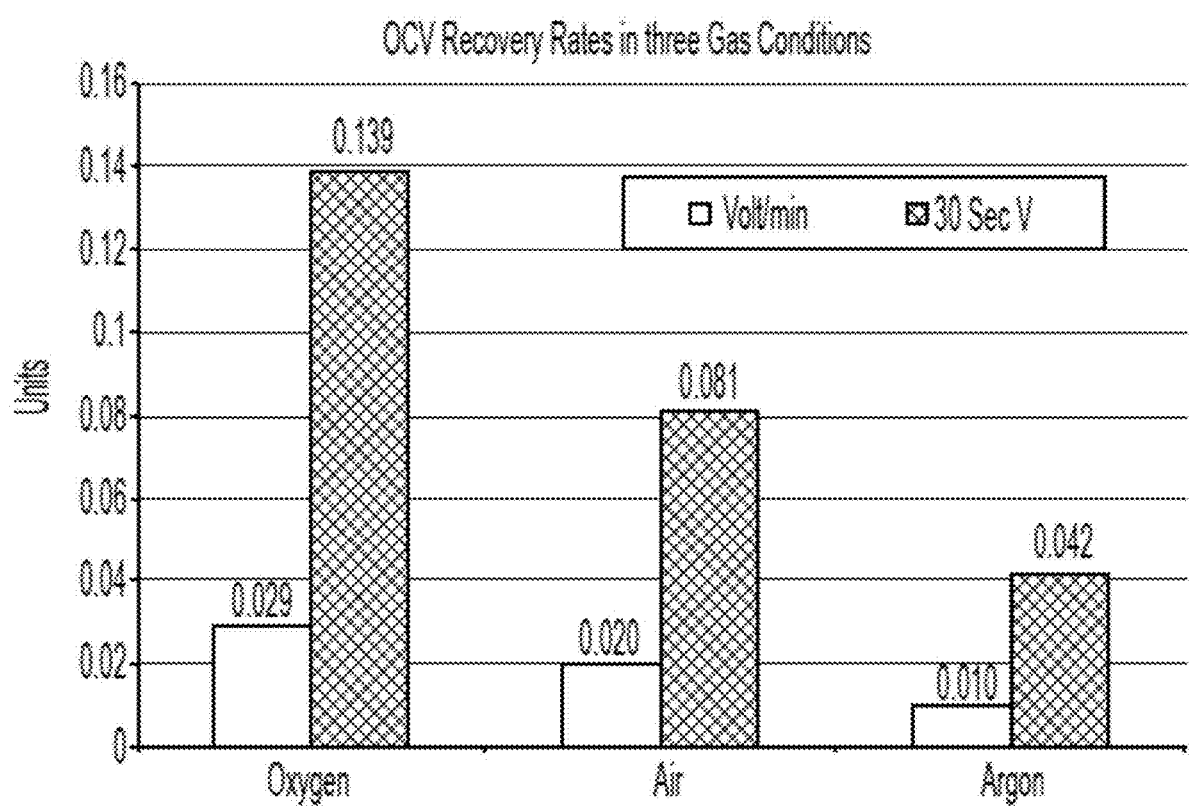
FIG. 25 is a graph showing OCV between the tests showing the OCV recovery rates in three different gas environments (Oxygen, Air and (0% oxygen))

FIG. 25 summarizes the OCV between the tests from the graph shown in FIG. 24. The light gray bar shows the rate of increase rate (i.e., initial slope of recovery) and the dark bar shows the voltage reached after 30 seconds.

Figure 26:
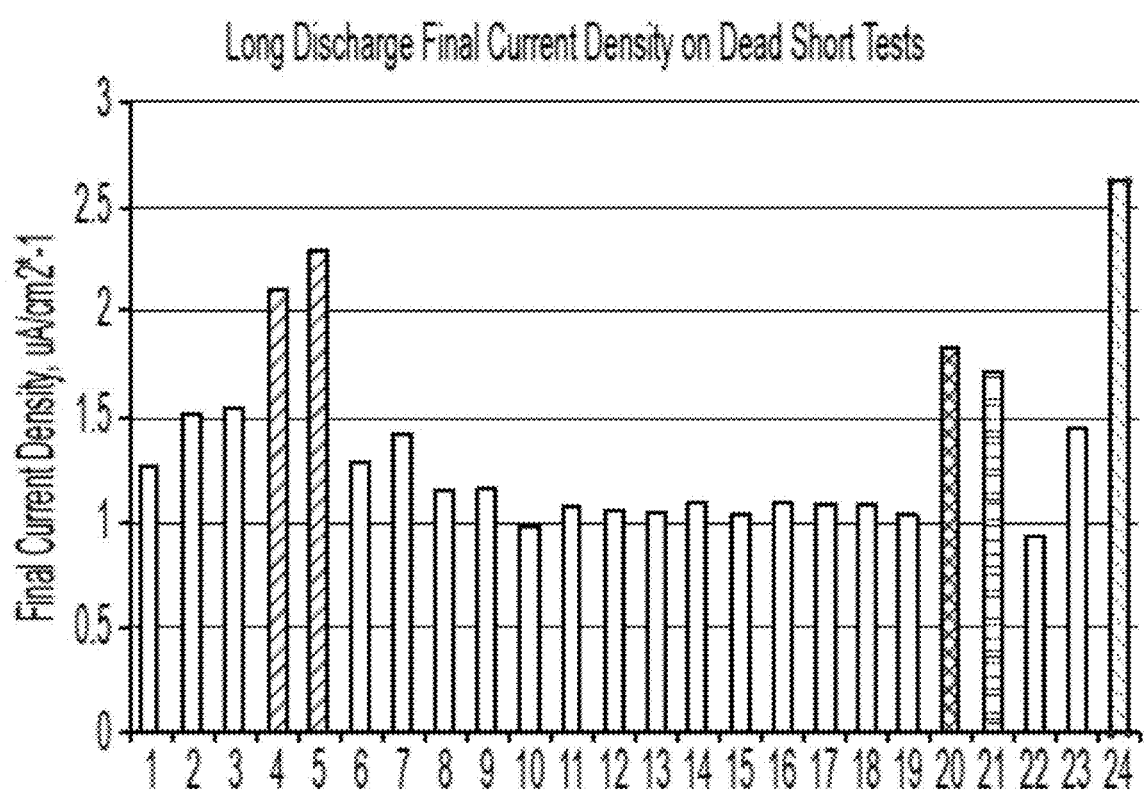
FIG. 26 is a graph showing dead-short discharges for the life of an exemplary solid-state energy harvester.

The energy harvester was tested on mostly 24-hour dead short discharge cycles and changing rest times. FIG. 26 shows the dead-short discharges for the life of this energy harvester (run number 24417) plotted in the order of the tests. Most of the bars are the current density at the end of a 24-hour test in 100% RH air. The two grey bars #4 and #5 were discharged in oxygen for an hour each. The fifth from the last (#20) is a 12-day discharge in 100% RH air. The fourth from the last (#21), was a series of environmental gas changes. The longest discharge is shown by the last bar (#24) showing the current density after 5 days of discharge. It increased the current output over time. The energy harvester appears to self-recharge as it discharges. The total discharge of this energy harvester during this series of tests of 560 hours (23 days), delivering 1.5 Coulombs.

Figure 27:
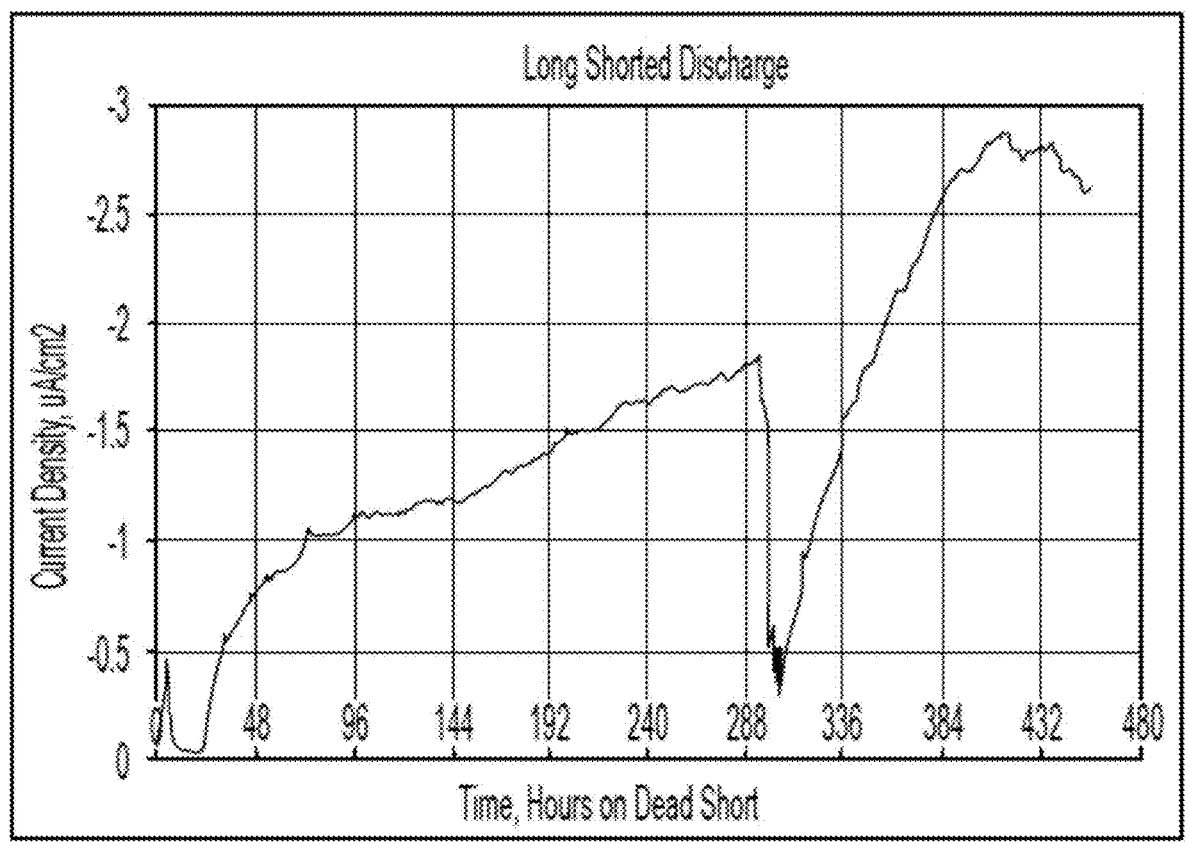
FIG. 27 is a graph showing long discharge over eight days of an exemplary solid-state energy harvester.

The last bar in this test was repeatedly interrupted to take impedance values. FIG. 27 shows this long discharge over many days of discharge with changing atmospheric gas composition. The discharge was interrupted several times for a few minutes to measure the impedance numbers (as shown later in FIG. 29). In this long test is a period of gas testing starting with a desiccated condition, followed at about 24 hours 100% RH air environment. After 12 days, a series of gas tests were run discussed below with FIG. 27. Then at about 290 hours (12 days), the chamber was filled with argon to displace the oxygen.

Figure 28:
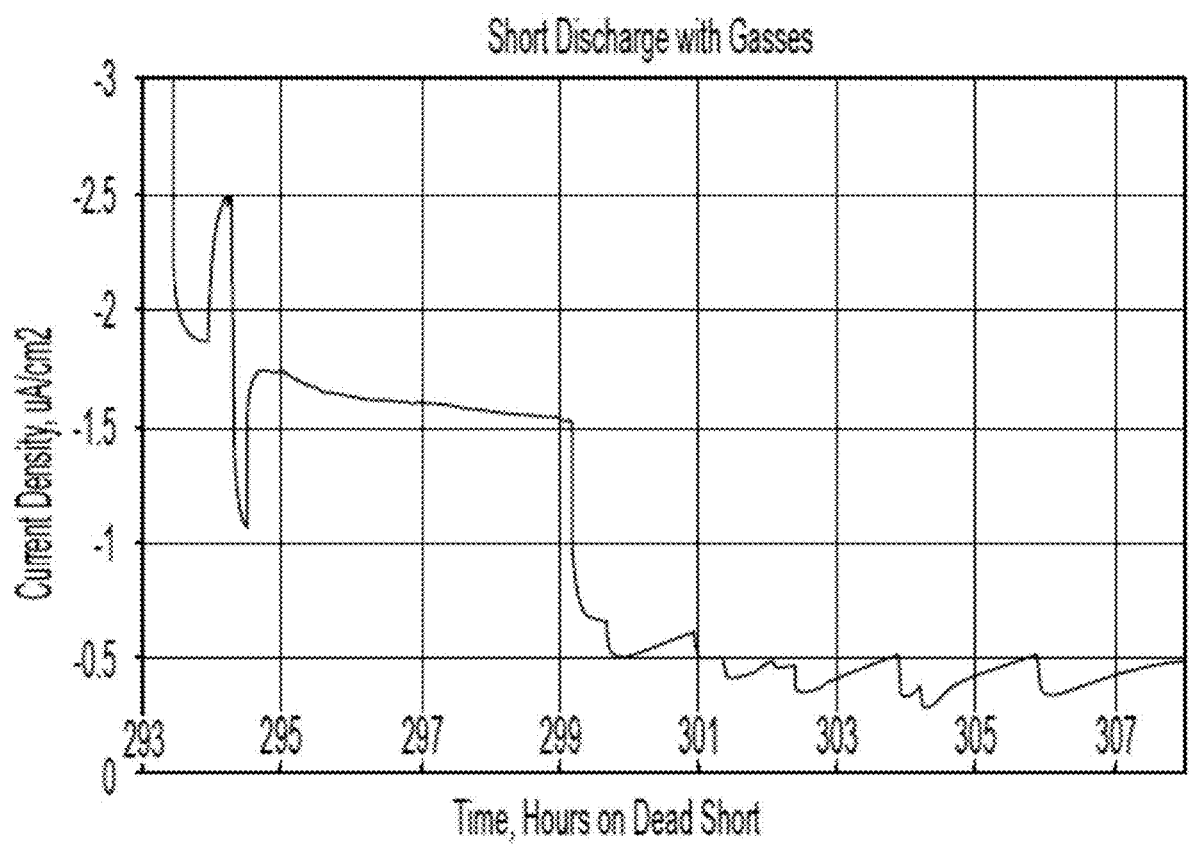
FIG. 28 is a graph showing the effect of adding oxygen or argon (0% oxygen) or air (20% oxygen) to the test chamber during energy harvester discharge of an exemplary solid-state energy harvester.

FIG. 28 provides exemplary results with air in the first portion, followed by oxygen at about 294.5 hours (12.25 days) where the output increased. This was followed by argon displacing oxygen at about 294 hours. Then air was introduced 30 minutes later until about 300 hours when argon was introduced. This was followed by many applications of argon due to the constant diffusion of atmospheric air into the test chamber. Again, the importance of oxygen is shown for this energy harvester.

With respect to FIG. 27, the chamber was re-filled with 100% Rh air and run for an additional six days. It not only fully recovered, but gave higher current density after the test. This cell ran for almost 20 days with no degradation and the current density improved over the course of the testing.

Figure 29:
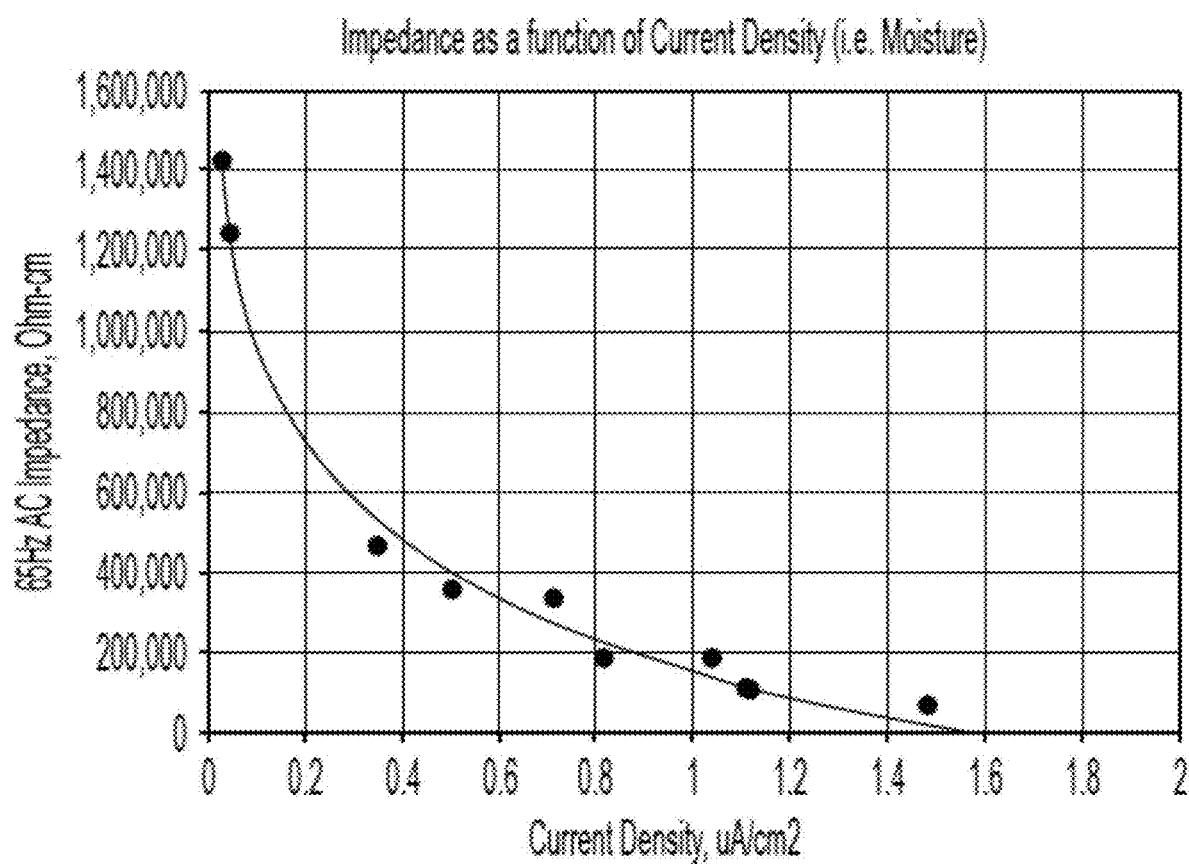
FIG. 29 is a graph showing impedance as a function of current density as an exemplary solid-state energy harvester humidifies to water-saturated conditions.

FIG. 29 shows the 65 kHz AC impedance as a function of the current density of the energy harvester as it humidifies from desiccated to water saturated conditions. There is a semi-logarithmic relationship (with a $R^2$ value of 99%), which shows that it is a first-order relationship. Without intending to be bound by theory, this appears to indicate that water ingress caused the change in impedance as the current density increases. In this example, AC impedance is lowered, which increases the current density.

Example 10

A 3-layer energy harvester was made using the Teflon rolling mill method described above in Example 2B: Rolling Electrode. In this example, the Teflon (PTFE) was added as a water suspension called Teflon 30. These particles are very small compared to the T7c powder described before.

The recipe for this 12-gram mixture was:

TABLE 3

| Molecule | $CeO_2$ | $WO_{2.9}$ | $Ti_4O_7$ | $Co_3O_4$ | T30 | $H_2O$ | Units |
|---|---|---|---|---|---|---|---|
| Anode | 2 | 4 | 6 | | 2.76 | 1.5 | g |
| Separator | 4 | 8 | | | 2.066 | 0.84 | g |
| Cathode | 2 | 4 | | 6 | 2.421 | 0.33 | g |

In this aspect, 40 volume percent Teflon was added to each electrode as was used for the Teflon 7C.

The procedure was as follows:
1) Weigh the active powders as usual, but with no Teflon 7C (alternatively, Teflon F-104 can be used).
2) Place powders in a 100 cc beaker and add 50 cc distilled water
3) Insert a stirring bar and bring to a deep vortex without sucking in air
4) Add the Teflon emulsion T30 drop wise
5) Allow to stir for about 30 minutes
6) Prepare a Buckner funnel and filter the slurry under high vacuum
7) Place the filter paper with the filter cake still attached into a glass dish
8) Place in a drying oven at 120° C. until dry (~6 hours for this 12 gram recipe).
9) Alternatively, place in a desiccator at room temperature until dry (~24 hours).
10) Scrape the dry cake from the paper and grind in a high-shear blender after adding the small aliquots of water in the recipe.
11) Use a rolling mill to form the electrodes.

The resulting electrodes were more robust than the dry method, and formed an energy harvester rather easily.

Figure 30:
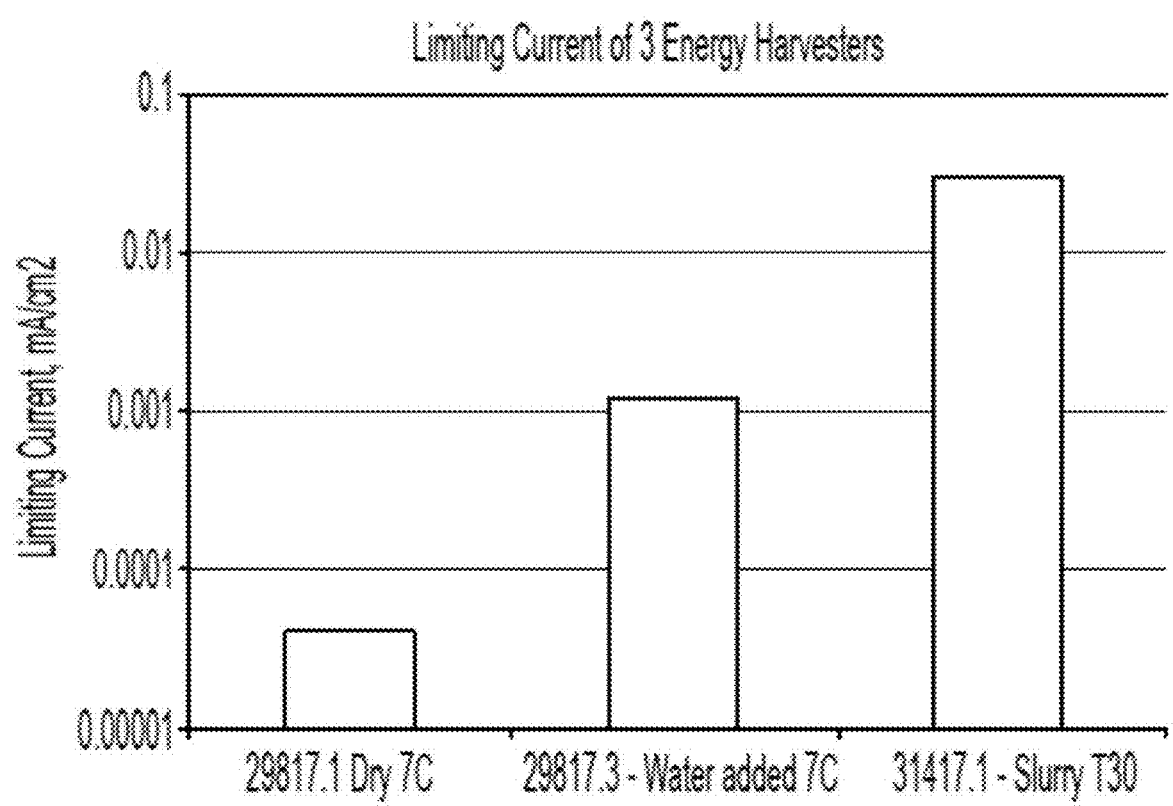
FIG. 30 shows the limiting current taken from the Voltammograms of three exemplary energy harvester designs.

FIG. 30 shows the limiting current taken from the initial voltammogram after building several energy harvesters. The first bar shows the limiting current (LC) of a new energy harvester using the dry Teflon 7C binder before humidification. The second bar shows the LC after humidification. The third shows the initial performance of the energy harvester made using the liquid emulsion T30 binder, removing the water via evaporation.

Figure 31:
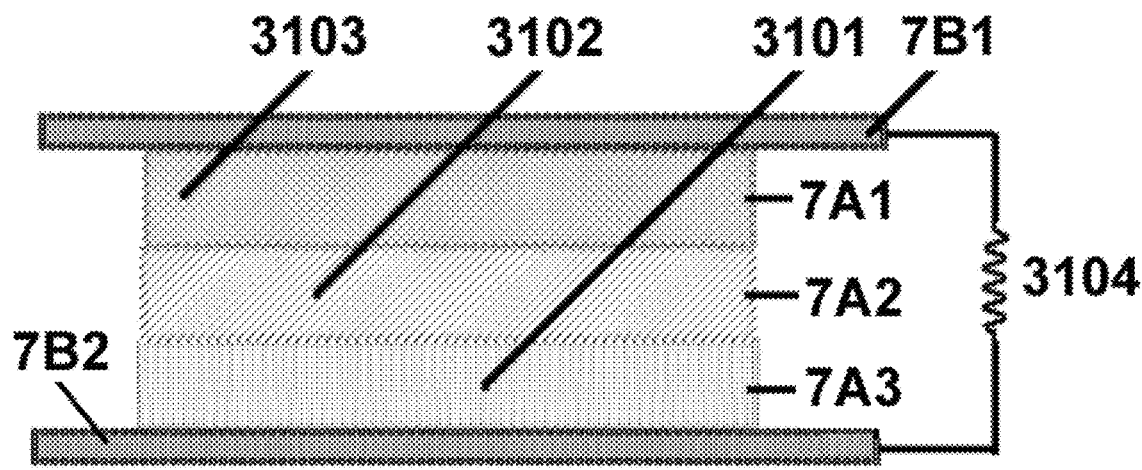
FIG. 31 shows the general electron flow of an exemplary energy harvester.

Without wishing the invention to be bound by theory, FIG. 31 generally illustrates the charge flow of an exemplary energy harvester described herein. It is believed that oxygen enters cathode 7A3 carrying its two negative charges (electrons). The oxygen nestles into the crystal structure and defects of cathode material 3101 (e.g., $Co_3O_4$), making an excess of electrons that slide onto the $CeO_2$ crystals with their loosely bound oxygen atoms, carrying two electrons with them. These electrons are free to migrate to separator layer 7A2, being attracted by the lower electronegativity of the $WO_{2.9}$, and facilitated by $CeO_2$ "electrolyte" 3102. The transition metal suboxide (e.g., $Ti_4O_7$) in anode 7A1 has a greater electronegativity than $Co_3O_4$ 3101 of cathode 7A3. These electrons are released by the oxygen reacting with hydroxyl ions, forming water vapor in anode body 3103, which escapes into the environment. Current collector 7B1 accumulates the excess electrons forming a potential across load 3104, returning the electrons to cathode current collector 7B2.

Layer 7A2 is optionally not included.

Example 11

Figure 32:
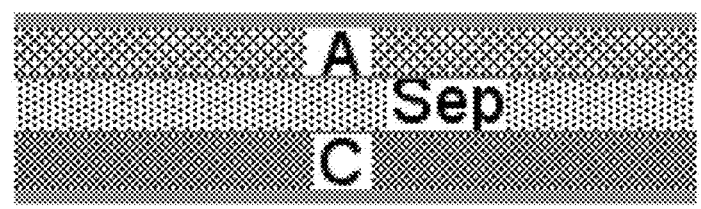
FIG. 32 shows an exemplary three-layer cell design with an anode (A), separator (Sep), and cathode (C)

Low impedance, three-electrode design:

In this aspect, the cell uses a high impedance portion to separate the charge. For example, the anode and cathode can comprise carbon (e.g., black or graphite) to reduce the impedance of the electrodes while retaining the high impedance in a layer of SSE situated between the electrodes as a solid-state separator (FIG. 32). In another aspect, $Ti_4O_7$ is added to the SSE to increase the DC resistance. In this aspect, the power density can be increased by about 10-fold.

In the exemplary aspect of FIG. 32, "A" is the anode and composed of the active compounds plus carbon, "Sep" is the SSE, and "C" is the cathode plus carbon. In another aspect, carbon loading can be about 5%. In another aspect, $Ti_4O_7$ or other impedance-increasing component can be added to the SSE separator layer to increase its resistance. The carbon was tested in the form of carbon black using CABOT Vulcan XC72R (also called simply "V72") and alternately Asbury Graphite Mills "Nano 307" powdered graphite. Loading below 5% is best, but even 0.5% is beneficial. Also tested was a mixture of the two carbon types.

The DC resistance of the components was measured to better understand the impedance character the exemplary cell. Table 4 shows the DC resistance of the cell components. Components 1-4 are the raw chemicals, components 5-6 are the anode without and with carbon, 7 is the SSE and 8 & 9 are the cathode without and with carbon. Items 5-9 all also contain 40 volume percent unsintered Teflon powder.

TABLE 4

| # | Material | Component & Electrode Ohm-cm Dry |
|---|---|---|
| 1 | $Ti_4O_7$ | 2,977,662 |
| 2 | $Co_3O_4$ | 24,615 |
| 3 | $WO_{2.9}$ | 4.96 |
| 4 | $CeO2$ | 63,300,000 |
| 5 | Anode | 1,488,843 |
| 6 | Anode w/Graphite | 393 |
| 7 | SSE | 205,213 |
| 8 | Cathode | 12,320 |
| 9 | Cathode w/Graphite | 149 |

Figure 33:
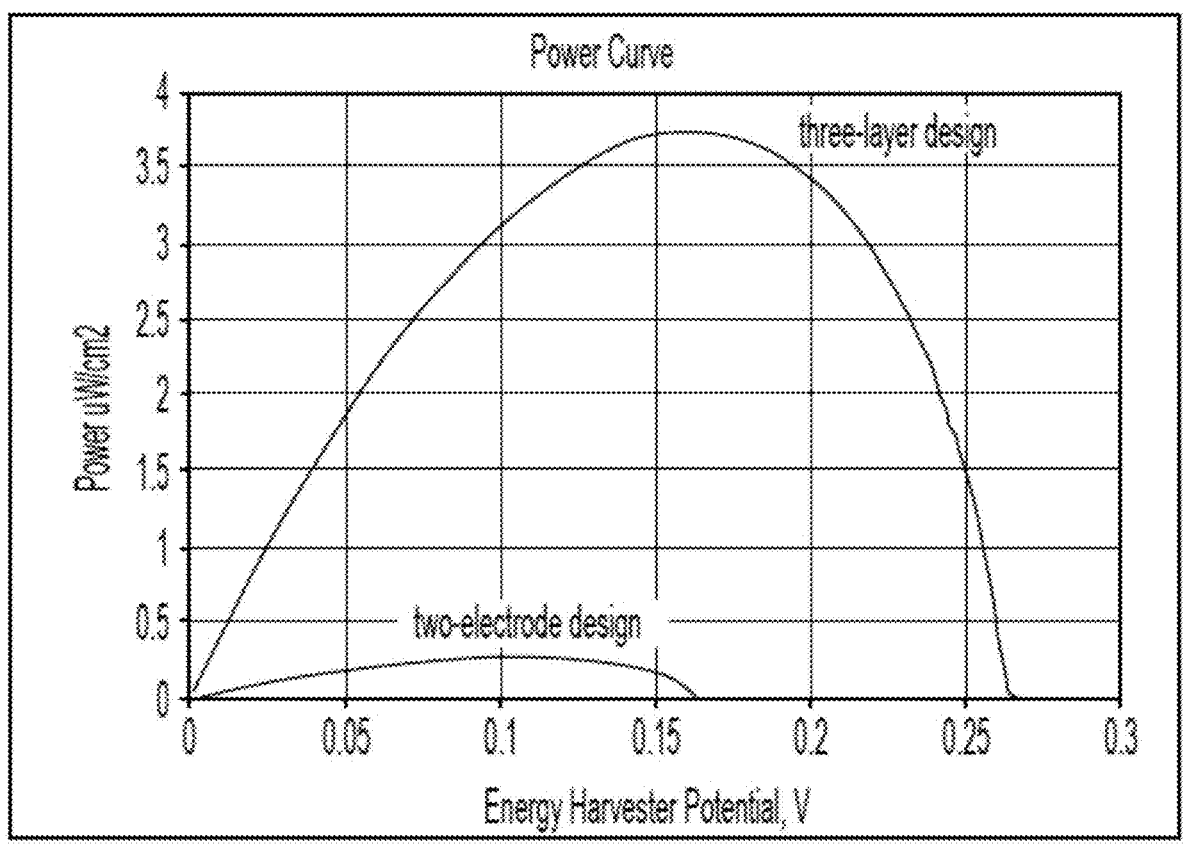
FIG. 33 shows power density curves with the addition of graphite to the anode and cathode in the three-layer cell design compared to a two electrode design without the addition of graphite to the anode and cathode and after shorting for 24 hours then open circuit voltage (OCV) recovery.

FIG. 33 shows that the exemplary three-layer design produces a 12.5 times higher discharge rate than 34818 cell (14 Dec. 2018). which was the highest tests before with no carbon in the electrodes. This cell was a two-electrode design.

Figure 34:
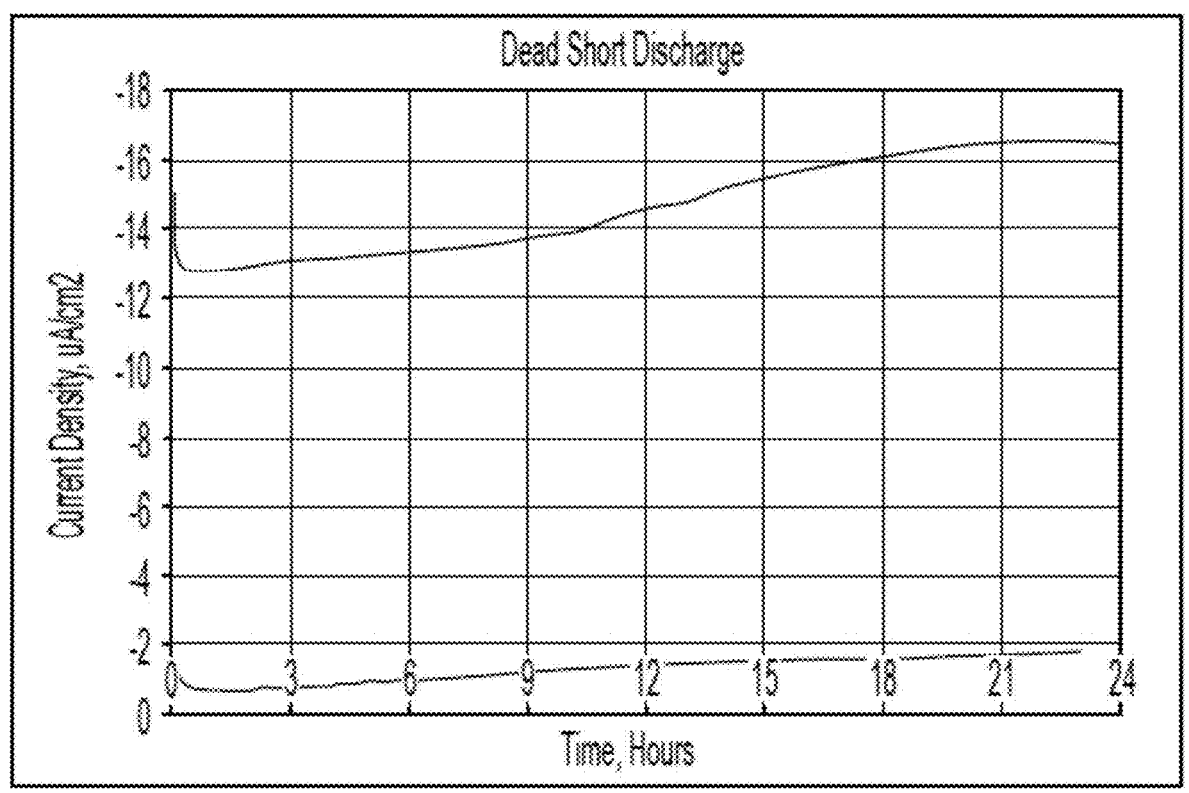
FIG. 34 shows power density during dead short discharge (top line) is increased by about 10-fold in the three-layer design with carbon added to the electrodes compared to a two electrode design without carbon added to the electrode (bottom line)

FIG. 34 shows the dead short discharge of a cell with and without carbon in the electrodes with an eight (8) fold increase in current density.

Figure 35:
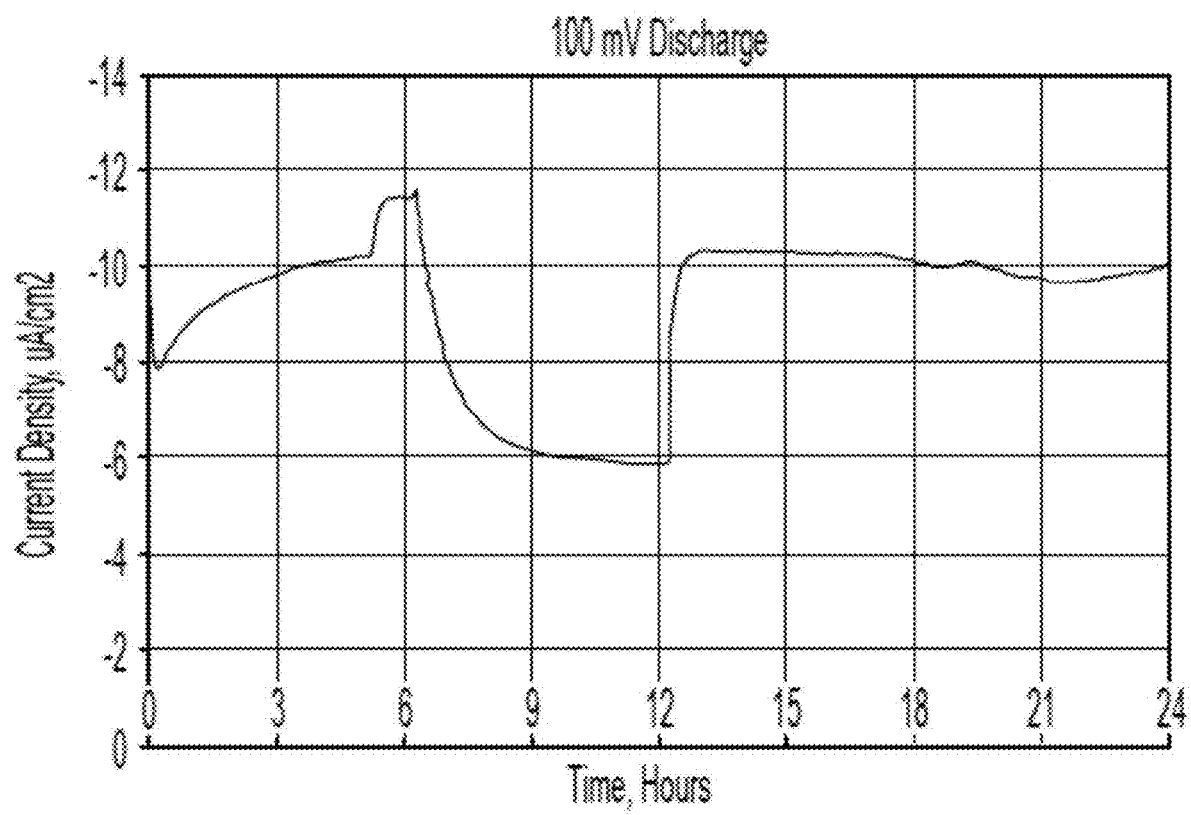
FIG. 35 shows 100 mV discharge in air, oxygen, argon, and argon over a 24-hour period in the three-design with carbon added to the electrodes.

As shown in FIG. 35 shows a potentiostatic discharge of the cell, beginning in humid air (20% oxygen), then at 4.5 hours in 100% humid oxygen. At 6 hours, the gas was changed to humid argon (0% oxygen) and at 12 hours back to humid air. In this aspect, it appears that oxygen content influences the output. Without being bound by theory, the fact that an argon atmosphere does not reach zero suggests that water vapor is being electrolyzed to produce its own oxygen in situ.

Figure 36:
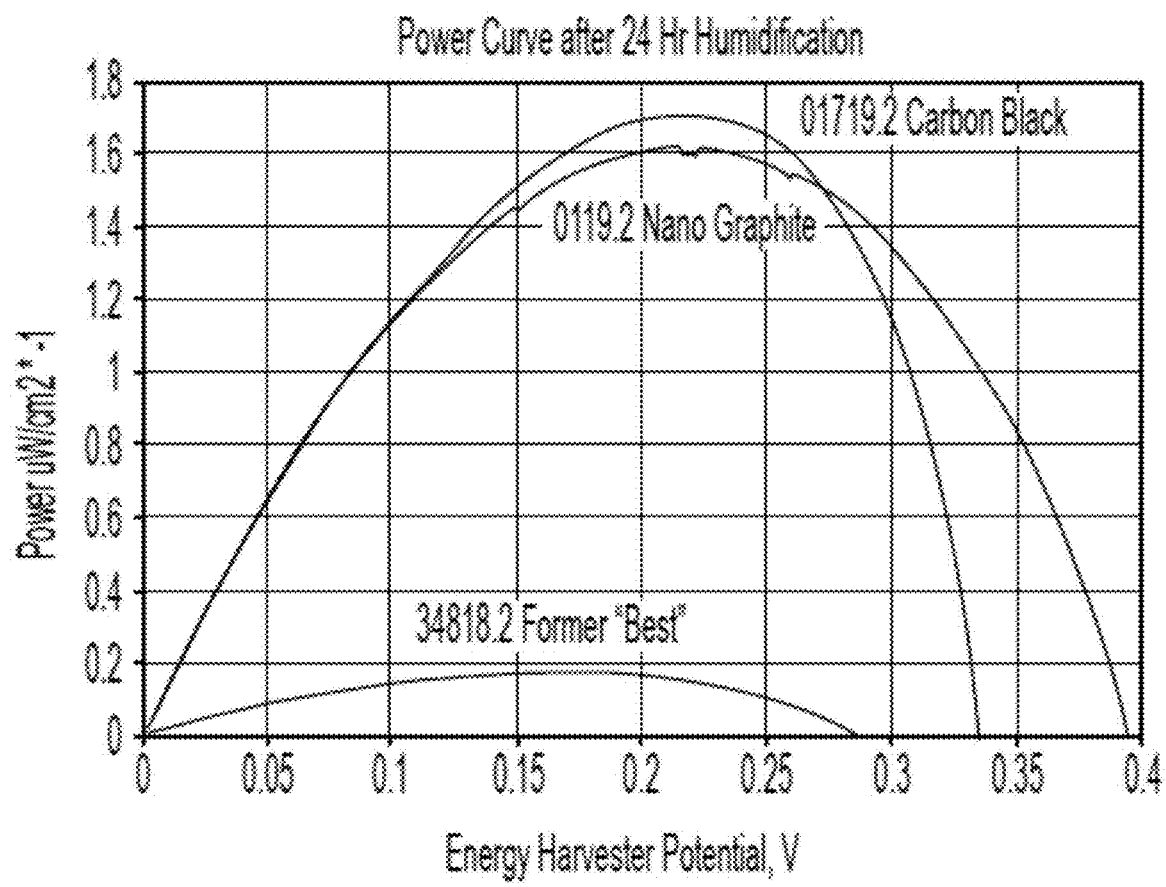
FIG. 36 shows the power curve for three exemplary designs as labeled: a power curve for a two-electrode design containing no carbon, a three-electrode design one with 3% nano graphite added to the anode and cathode and an SSE layer between the anode and cathode, and a three-electrode design with 3% Vulcan 72 carbon black added to the anode and cathode with a SSE layer between the anode and cathode.

FIG. 36 shows the power curve for three example designs. The bottom curve is for a two-electrode design and contained no carbon. The top two curves are three-electrodes designs one with 3% nano graphite and the other with 3% Vulcan 72 carbon black added to the anode and cathode with a SSE layer between the two for separation of charge across it's relatively higher impedance.

Next, carbon black was used in the anode and cathode at the same loading levels as the graphite was in the previous run. After "activation" (shorting for 24 hours, then OCV for 6 hours) this cell with carbon black was a bit higher in power density than the graphite, but graphite achieved a slightly higher exchange potential. In another aspect, carbon black and graphite can be mixed in the electrodes.

In one aspect, carbon can be added to the anode and cathode at between about 2% to about 6%. In another aspect, the amount of carbon added to the anode and cathode can be about 4%.

Example 12

These electrodes can be produced using a painted method if the binder is liquid based that will then be removed. A painted energy harvester was developed using a 25% dilution of a latex medium (lot 03717). Each electrode was rolled material that was then re-ground to chop up the fibrillated Teflon fibrils. The resulting mixture was then mixed 50/50 with a 25% solution of latex binder resulting in a thick paint-like material. The paint-like material was painted on to a 1 mil sheet of nickel that had previously been painted with a thin coat of 50% diluted Timrex LB1016 graphite conductive paint. Each electrode was dried between applications. The final thickness was just 12 mils (0.012" or 0.3 mm). Discs were then blanked out using a ¾" arch punch. The resulting energy harvester proved feasibility, but delivered low current density values compared to the rolled or pellet methods.

Example 13

An exemplary low impedance, three-electrode design with gold-plated current collectors, nano powder size and carbon additive was tested.

In this aspect, the cell uses a high impedance portion to separate the charge as described in Example 11. In this example, the anode current collector had a heavy gold plating on the brass sheet current collector, and the cathode used a porous carbon fiber (Sigracet 25 BC from FuelCell-Store.com) cloth current collector. Without being bound by theory, it is believed that carbon fiber cloth current collector permitted airflow into the cathode, but not the anode resulting in an unexpected increase in performance.

In this example, the anode mixture is ground in a high sheer blender for about 5 minutes, and then the carbon is hand mixed until the mixture appears uniform in color (e.g., about three minutes), similar to "folding" in egg whites in a cake mixture. The same procedure is applied to the cathode powders (e.g., the SSE is blended in a high sheer blender, but no carbon is added).

Figure 37:
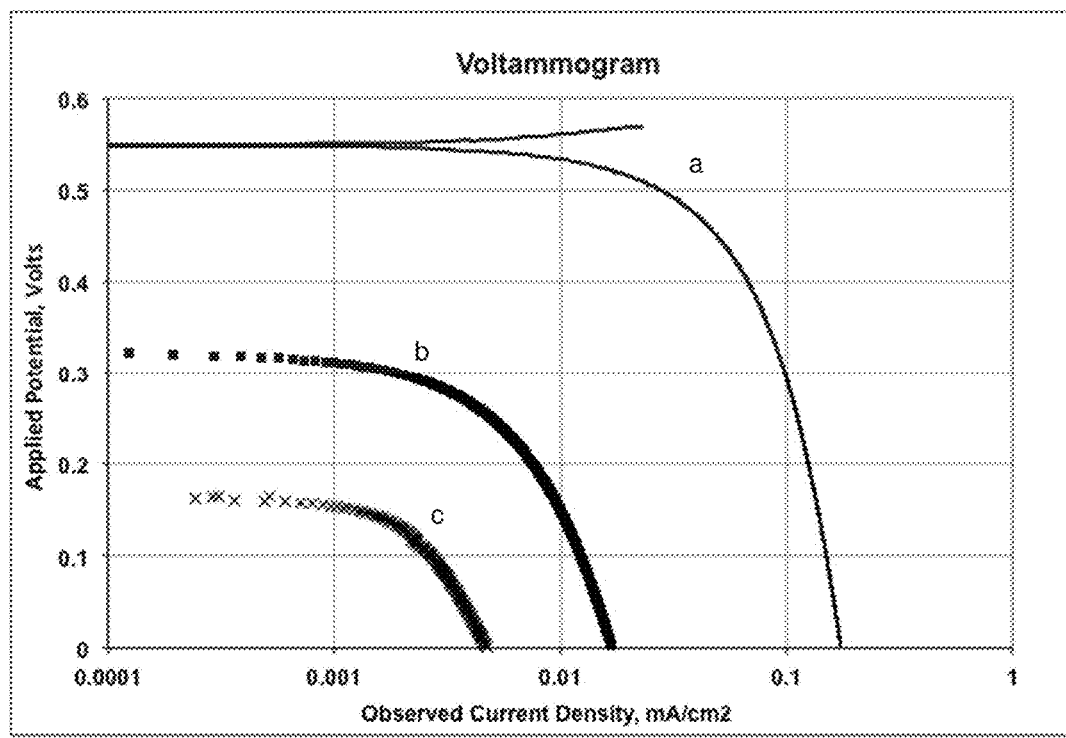
FIG. 37 shows performance improvement using an exemplary three-electrode design with gold-plated current collectors, nano-size powder and carbon additive.

FIG. 37 shows the performance improvement in three steps as polarization curves expressed as Voltammograms.

Scan c was generated from the cell providing the previous best results. Scan b was generated from a cell with the carbon additive to the anode and cathode during high sheer grinding and increased current density by 3.7-fold compared to the lowest scan. Scan a was generated from a cell that included 2% V72 carbon black added to the anode and cathode using the gentile folding method resulting in a 38.4 fold increase in current density. All components in this cell were nano sized except the carbon, and the cathodic current collector was carbon paper with the anode heavily gold-plated brass current collector.

Example 14

Figure 38:
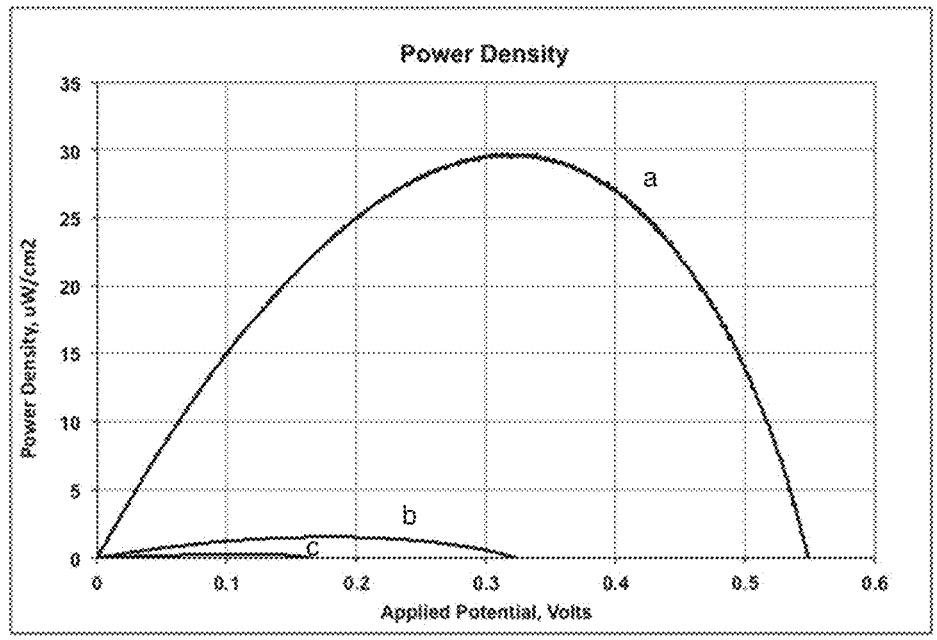
FIG. 38 shows performance improvement from the three-electrode design of FIG. 37 showing the first derivative of the polarization curve.

FIG. 38 shows the performance improvement from the three-electrode design of Example 13 showing the first derivative of the polarization curve (i.e., the power vs applied potential curve)

Scan c was generated from the cell providing the previous best results. Scan b was generated from a cell with the carbon additive to the anode and cathode during high sheer grinding and increased power density by 5.7-fold compared to the lowest scan. Scan a was generated from a cell that included 2% V72 carbon black added to the anode and cathode using the gentile folding method resulting in a 110 fold increase in current density. All components in this cell were nano sized except the carbon, and the cathodic current collector was carbon paper with the anode heavily gold-plated brass current collector.

Example 15

Figure 39:
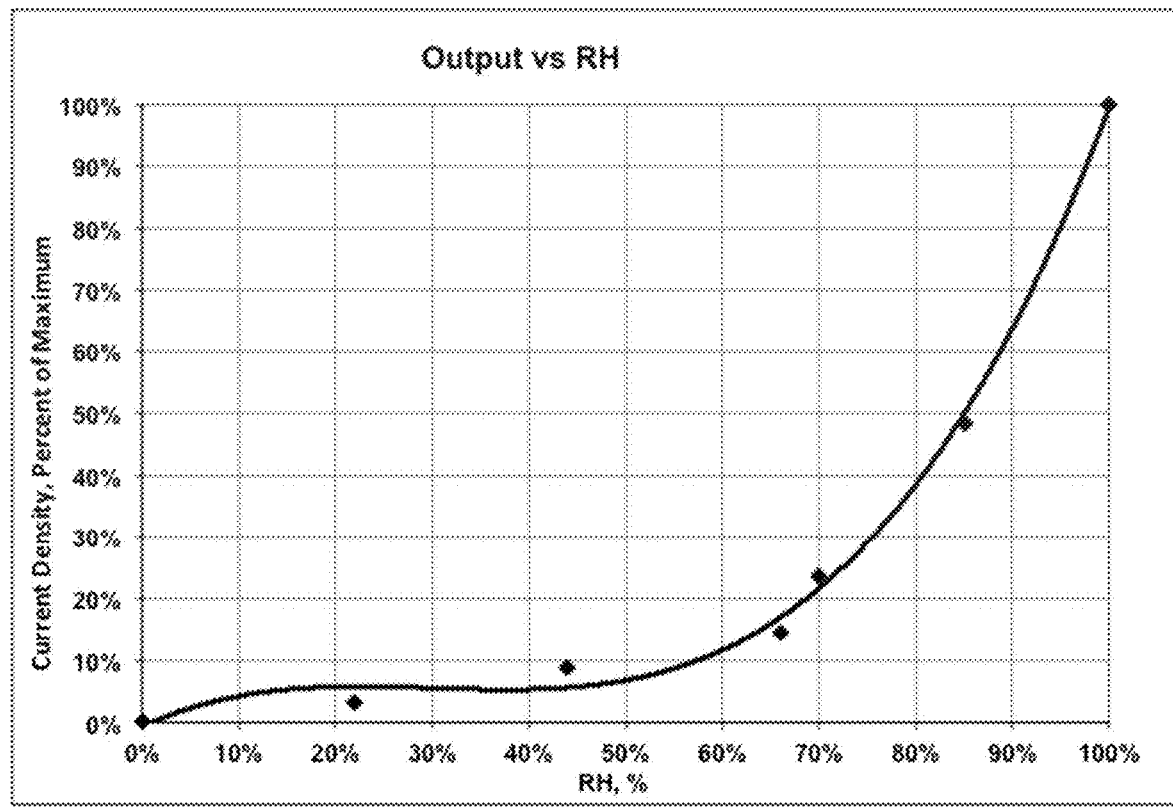
FIG. 39 shows the results of an exemplary experiment showing the effects of relative humidity (RH) on current output.

A series of water glycerin mixtures was used to generate humidified air for testing of the exemplary well-functioning three-electrode cell on a dead-short discharge. FIG. 39 shows the resulting output (i.e., current density). At 85% RH, the ultimate performance is 50% of its maximum at 100% RH. In one aspect, increasing the relative humidity (e.g., above 50%) can increase the current density.

Example 16

In this example, cells were prepared with the active component of $Ti_4O_7$ in the anode and $Co_3O_4$ for the cathode. One cell used an activated Nafion (sulfonated tetrafluoroethylene based fluoropolymer-copolymer having a chemical formula of C7HF13O5S—C2F4) separator (DuPont), which transports only protons (H+). Another cell was prepared with an AEM-215-30 Anion Exchange Membrane (AEM) separator. The exemplary cell having the Nafion separator ran at 13 times higher current output when using Nafion than when using AEM. Without being bound by theory, it is believed that that the charge-transfer involves proton transport from the anode to the cathode and not hydroxyl groups (OH⁻). In one aspect, the exemplary three-electrode design can use a Nafion separator to achieve higher current output.

Example 17

Figure 40:
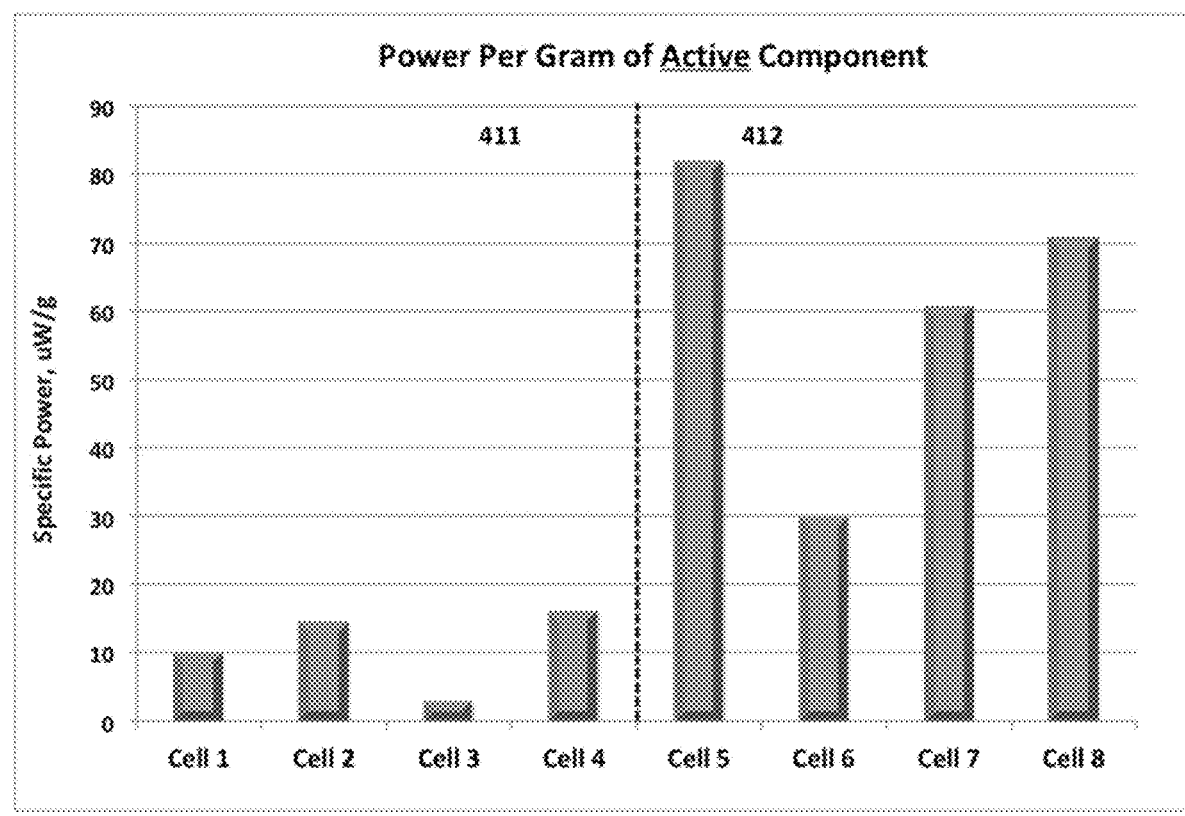
FIG. 40 shows cell specific current density of the exemplary active components ($Ti_4O_7$ and $Co_3O_4$) with and without the exemplary solid state electrolyte (SSE) separator ($CeO_2$ and $WO_{2.9}$)
Figure 41:
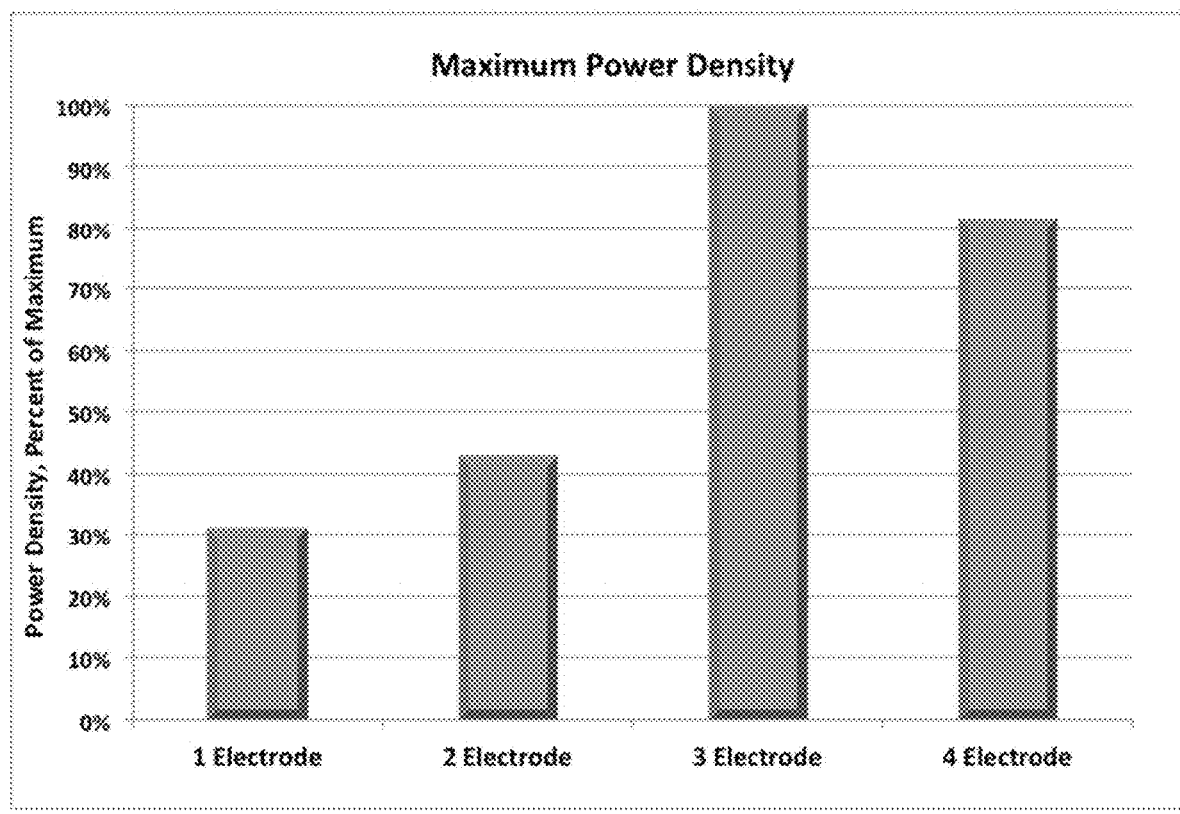
FIG. 41 shows the results of an exemplary study of cell power density as a percentage of the maximum cell power with varying electrode thickness.

FIG. 40 shows the Specific Power Density of the active components. In FIG. 41, exemplary cells using only the active components ($Ti_4O_7$ and $Co_3O_4$) (411) were compared to a control mixture of active components and an SSE separator ($CeO_2$ & $WO_{2.9}$). As shown in FIG. 40, the combination of the exemplary active components and the SSE separator between about 20 and 70% more specific power. In this example, cells can be made with only the active components ($Ti_4O_7$ and $Co_3O_4$), however with the SSE ($CeO_2$ & $WO_{2.9}$) performance is surprisingly improved (e.g., 3 times more power density and 4 times the specific power). Without being bound by theory, it is believed that the SSE in this example behaves catalytically or functions in active transport of oxygen molecules.

Example 18

Cells were prepared using exemplary layered electrodes to double, triple and quadruple the electrode thickness. In this example, a single electrode was 0.23 mm thick. The thickness series used was 0.23 mm, 0.46 mm, 0.69 mm and 0.92 mm. As can be observed in FIG. 41, the performance was improved by about 70% up to three layers (0.69 mm) with about a 50% improvement at 0.92 mm. 0.46 mm provided about a 10% improvement. In this example, the power density performance of the cells showed that thicker electrodes surprisingly improved performance to a limit: 0.23 mm<0.46 mm<0.69 mm=0.92 mm.

Example 19

Assembly Modes and Methods: In one aspect, this energy harvester is assembled as follows:
a. A solid anodic current collector, which should be of a material that does not react with the active ingredients. This could be nickel, gold, gold-plated metal or carbon and should cover most or the entire anode surface.
b. An anode composed of an admixture of the solid-state electrolyte and a suboxide of a transition metal. The physical form of this layer is compressed and held together using a porous binder. It may also be applied as a paint using a liquid binder that is dried after application.
c. A layer called a "separator" consisting of only the solid-state electrolyte and the binder. It may be the same thickness of the anode and cathode, or it may be thinner than the anode and cathode or it may be missing all together.
d. A cathode composed of the solid-state electrolyte and a suboxide of a transition metal, which is less electronegative than the suboxide used in the anode.
e. A cathode current collector, which should be of a material that does not react with the active ingredients. This could be nickel, gold, gold-plated metal or carbon, and should cover most or the entire cathode surface. This layer is preferably porous, such as foamed metal, perforated metal of porous carbon.

Example 20

Binders: In this example, the powders described herein are not sintered, but rather bound together using a binder. They are therefore "green" (unsintered). Binders that may function in this energy harvester include fibrillated Teflon (PTFE), Latex, albumen, hydrogels, aerogels, or other organic or inorganic binders with low conductivity. The material needs to be porous and have very high internal impedance; higher than the active ingredients of the invention. The binders may start with a solvent that when dried, results in a high impedance, high porosity binder.

Example 21

Exemplary Applications: This energy harvester can be used in low-power applications where there is a constant source of atmospheric air. Preferably this air is moving, such as in the flow from a ventilation fan or on a moving vehicle. If on a digital watch, the energy harvester case will need to be porous for air access. Examples include the list below among others:
a. Gas sensors, due to its sensitivity to atmospheric gas composition
b. Any low-power device such as electronic watches, low-power LED's,
c. Any place with constant air movement such a moving vehicle, within the flow of a cooling or ventilation fan, on the blade of a windmill, upon the wing of an aircraft among many others.
d. Painting the anode portion on a solid surface with subsequent layers painted over it, terminating with some porous current collector would result in a large surface area, high current output for many applications.

Unless indicated otherwise, potentials ($E_o$) reported herein are from the following source: en.wikipedia.org/wiki/Standard_electrode_potential_(data_page).

The term "energy harvester" used herein is not limited in a mechanical way to be an enclosed body with electrodes, but may be open to the environment on one of more sides of the device. The term "solid state energy harvester" may be interpreted as a "solid state energy source."

This device may function as an energy storage unit such as a battery or as a capacitor.

The definitions for the Kroger-Vink Notation used herein and be found at many sources including Wikipedia (en.wikipedia.orq/wiki/Kröger-Vink notation) or more scholarly sites such as (www.tf.uni-kiel.de/matwis/amat/def_en/kap_2/backbone/r2_4_2.html)

References cited in this disclosure are incorporated herewith in their entirety.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

The invention claimed is:

1. A solid-state energy harvester, comprising:
   a first current collector comprising a conductor;
   a first layer comprising a first transition metal suboxide, and a solid-state electrolyte (SSE) wherein the first layer is an anode and in contact with the current collector;
   a second layer comprising an admixture of a second transition metal suboxide, and a lanthanide oxide or dioxide, wherein the admixture forms an SSE and is in contact with the first current collector; and
   a third layer comprising a third transition metal suboxide, wherein the third layer is a cathode and is in contact with the second layer, and a second current collector.

2. The solid-state energy harvester of claim 1, wherein the first transition metal suboxide is selected from the group consisting of tungsten suboxide, cobalt suboxide, $Na_{1.0}Mo_{1.5}WO_{6.0}$, $Na_{0.9}Mo_6O_{17}$, $Na_{1.2}Ti_{1.5}WO_{4.5}$, $Na_{1.2}Ti_{0.34}WO_4$, $Ti_4O_7$, $Ti_5O_9$, $K_{1.28}Ti_8O_{16}$, $K_{1.04}Ti_8O_{16}$, $K_{0.48}Ti_8O_{16}$, $Na_4WO_3$, $Na_{0.90}WO_{1.81}$, $Na_{0.82}WO_{1.81}$, $Na_{0.74}WO_{1.81}$, $K_{0.9}WO_3$, $WO_{2.72}$, $WO_{2.82}$, $WO_{2.9}$, $Na_2WO_4$, $Na_{8.2}WO$, $Na_2O_2WO_3$, $Na_{1.2}Ti_{0.34}WO_4$, $Na_{1.2}Cu_{0.31}WO_{7.2}$, $Na_{1.2}Mo_{0.31}WO_{5.2}$, and $Na_2O_4WO_3$.

3. The solid-state energy harvester of claim 1, wherein the third transition metal suboxide is selected from the group consisting of tungsten suboxide, cobalt suboxide, $Co_3O_4$, $Na_{1.0}Mo_{1.5}WO_{6.0}$, $Na_{0.9}Mo_6O_{17}$, $Na_{1.0}Ti_{1.5}WO_{4.5}$, $Na_{1.2}Ti_{0.34}WO_4$, $K_{1.28}Ti_8O_{16}$, $K_{1.04}Ti_8O_{16}$, $K_{0.48}Ti_8O_{16}$, $Na_4WO_3$, $Na_{0.90}WO_{1.81}$, $Na_{0.82}WO_{1.81}$, $Na_{0.74}WO_{1.81}$, $K_{0.9}WO_3$, $WO_{2.72}$, $WO_{2.82}$, $WO_{2.9}$, $Na_2WO_4$, $Na_{8.2}WO$, $Na_2O_2WO_3$, $Na_{1.2}Ti_{0.34}WO_4$, $Na_{1.2}Cu_{0.31}WO_{7.2}$, $Na_{1.2}Mo_{0.31}WO_{5.2}$, and $Na_2O_4WO_3$.

4. The solid-state energy harvester of claim 1, wherein the lanthanide oxide is selected from the group consisting of cerium dioxide, lanthanum oxide or dioxide, praseodymium oxide or dioxide, neodymium oxide or dioxide, promethium oxide or dioxide, samarium oxide or dioxide, europium oxide or dioxide, gadolinium oxide or dioxide, terbium oxide or dioxide, dysprosium oxide or dioxide, holmium oxide or dioxide, erbium oxide or dioxide, thulium oxide or dioxide, ytterbium oxide or dioxide, and lutetium oxide or dioxide.

5. The solid-state energy harvester of claim 1, wherein the first transition metal suboxide is $Ti_4O_7$.

6. The solid-state energy harvester of claim 1, wherein the second transition metal suboxide is $WO_{2.9}$.

7. The solid-state energy harvester of claim 1, wherein the third transition metal suboxide is $Co_3O_4$.

8. The solid-state energy harvester of claim 1, wherein the first transition metal suboxide comprises $Ti_4O_7$, the second transition metal suboxide comprises $Co_3O_4$, and the SSE comprises $CeO_2$ and $WO_{2.9}$.

9. The solid-state energy harvester of claim 1, wherein a thickness of at least one of the first layer, second layer and the third layer is from 0.25 mm to 1 mm.

10. The solid-state energy harvester of claim 9, wherein a thickness of at least one of the first layer, second layer and the third layer is 0.7 mm.

11. The solid-state energy harvester of claim 1, wherein a current density produced by the solid-state energy harvester in a relative humidity of 85% is 50% of its maximum current density at 100% RH.

12. The solid-state energy harvester of claim 1, wherein the conductor comprises a metal selected from the group consisting of gold, nickel, copper, brass, bronze, and porous carbon fiber.

13. The solid-state energy harvester of claim 1, wherein the current collector comprises a foamed metal.

14. A solid-state energy harvester system, comprising a first energy harvester and a second energy harvester, wherein the first energy harvester and the second energy harvester comprise the solid-state energy harvester of claim 1, and wherein the first layer of the first energy harvester is in electrical connection to the third layer of the second energy harvester.

15. The solid-state energy harvester of claim 14, wherein the first layer of each of the first and second energy harvesters comprises titanium suboxide and the third layer of each of the first and second energy harvesters comprises cobalt suboxide.

16. A solid-state energy harvester, comprising:
   a current collector comprising a porous carbon fiber cloth;
   a first layer comprising a first transition metal suboxide, and a solid-state electrolyte (SSE) wherein the first layer is an anode and in contact with the current collector;
   a second layer comprising an admixture of a second transition metal suboxide, and a lanthanide oxide or dioxide, wherein the admixture forms a SSE and is in contact with the first layer; and
   a third layer comprising a third transition metal suboxide, wherein the third layer is a cathode and is in contact with the second layer, the anode, and the current collector wherein the solid-state energy harvester produces current in a presence of oxygen and water vapor.

17. A method of making a solid-state energy harvester, comprising:
   grinding an anode mixture comprising a first transition metal suboxide, a solid-state electrolyte, and a binder;
   grinding a solid-state electrolyte (SSE) mixture comprising a lanthanide, a second transition metal suboxide, and a binder;
   grinding a cathode mixture comprising a third transition metal suboxide, a solid-state electrolyte and a binder;
   admixing a carbon powder to each of the anode mixture, the SSE mixture and the cathode mixture;
   forming the anode mixture into a first layer, wherein the first layer is an anode;
   forming the SSE mixture into a second layer, wherein the second layer is an SSE separator;
   forming the cathode mixture into a third layer, wherein the third layer is a cathode; and
   connecting the first layer to the second layer and the second layer to the third layer wherein the first transition metal suboxide and the second transition metal suboxide are different from each other.

18. The method of claim 17, wherein the first transition metal suboxide and the second transition metal suboxide are each selected from the group consisting of tungsten suboxide, cobalt suboxide, $Co_3O_4$, $Na_{1.0}Mo_{1.5}WO_{6.0}$, $Na_{0.9}Mo_6O_{17}$, $Na_{1.0}Ti_{1.5}WO_{4.5}$, $Na_{1.2}Ti_{0.34}WO_4$, $Ti_4O_7$, $Ti_5O_9$, $K_{1.28}Ti_8O_{16}$, $K_{1.04}Ti_8O_{16}$, $K_{0.48}Ti_8O_{16}$, $Na_4WO_3$, $Na_{0.90}WO_{1.81}$, $Na_{0.82}WO_{1.81}$, $Na_{0.74}WO_{1.81}$, $K_{0.9}WO_3$, $WO_{2.72}$, $WO_{2.82}$, $WO_{2.9}$, $Na_2WO_4$, $Na_{8.2}WO$, $Na_2O_2WO_3$, $Na_{1.2}Ti_{0.34}WO_4$, $Na_{1.2}Cu_{0.31}WO_{7.2}$, $Na_{1.2}Mo_{0.31}WO_{5.2}$, and $Na_2O_4WO_3$.

19. The method of claim 17, wherein the anode mixture, the SSE mixture, and the cathode mixture are ground in a high-shear, high intensity blender for at least one minute.

20. The method of claim 17, wherein the first layer, second layer and the third layer are not separated by physical separators.

21. The method of claim 17, wherein the first transition metal suboxide and third transition metal suboxide are each selected from the group consisting of titanium, cobalt, tungsten, or cesium.

22. The method of claim 17, wherein the first transition metal suboxide comprises titanium suboxide.

23. The method of claim 17, wherein each of the anode mixture and the SSE mixture has a water content of less than 25 weight percent.

24. The method of claim 17, wherein the third transition metal suboxide comprises cobalt suboxide.

25. The method of claim 24, wherein each of the first layer, the second layer and the third layer has a water content of less than 5 weight percent.

26. The method of claim 17, wherein each of the first layer, second layer and the third layer comprises a solid-state electrolyte comprising tungsten suboxide and cerium dioxide.

27. The method of claim 17, wherein each of the anode mixture, the SSE mixture, and the cathode mixture has a water content of less than 10 weight percent.

28. The method of claim 17, wherein the binder is selected from the group consisting of, unsintered polytetrafluoroethylene (PTFE), FEP, Paraffin and epoxy.

29. The method of claim 28, where the binder is less than 50 volume percent of each of the first layer, second layer and the third layer.

30. The method of claim 17, wherein the first layer, the second layer, and the third layer are formed by compression in a roller mill to produce a back-extrusion.

31. The method of claim 17, wherein the solid-state energy harvester does not contain physical separators between the first layer and the second layer and the third layer.

32. The method of claim 17, wherein the anode mixture comprises 17% (w/w) $CeO_2$, 33% (w/w) $WO_{2.9}$, 50% (w/w) $Ti_4O_7$ and 40 volume percent powdered PTFE.

33. The method of claim 18, wherein the cathode mixture comprises 17% (w/w) $CeO_2$, 33% (w/w) $WO_{2.9}$, 50% (w/w) $Co_3O_4$ and 40 volume percent powdered PTFE.

34. The method of claim 17, wherein:

the anode mixture comprises 17% (w/w) $CeO_2$, 33% (w/w) $WO_{2.9}$, 50% (w/w) $Ti_4O_7$ and 40 volume percent powdered PTFE;

the solid-state electrolyte mixture comprises 67% (w/w) $WO_{2.9}$, 33% (w/w) $CeO_2$ and 40 volume percent powdered PTFE and the cathode mixture comprises 17% (w/w) $CeO_2$, 33% (w/w) $WO_{2.9}$, 50% (w/w) $Co_3O_4$ and 40 volume percent powdered PTFE.

35. The method of claim 17, wherein each of the first layer, second layer and the third layer comprise Teflon particles, the binder comprise powders, and each of the first layer, second layer and the third layer is made using a roller mill to force extrude the powders through rollers of a mill, and extrude the Teflon particles into fibrils.

36. The method of claim 17, wherein the solid-state energy harvester is encased in a non-conductive, essentially gas impervious housing.

* * * * *